(12) United States Patent
Sedgwick et al.

(10) Patent No.: US 7,713,013 B2
(45) Date of Patent: May 11, 2010

(54) SUPPORTING DEVICE

(75) Inventors: Leonard John Sedgwick, Indian River (CA); Anne Marie Sedgwick, Indian River (CA)

(73) Assignee: InnoZinc, Inc., Indian River, Ontario (CA)

( * ) Notice: Subject to any disclaimer, the term of this patent is extended or adjusted under 35 U.S.C. 154(b) by 313 days.

(21) Appl. No.: 11/244,170

(22) Filed: Oct. 6, 2005

(65) Prior Publication Data

US 2006/0076849 A1    Apr. 13, 2006

Related U.S. Application Data

(60) Provisional application No. 60/626,776, filed on Nov. 10, 2004.

(30) Foreign Application Priority Data

Oct. 8, 2004    (CA) .................................... 2484381

(51) Int. Cl.
*F16B 35/04*    (2006.01)
(52) U.S. Cl. .................... 411/411; 411/84; 411/402; 411/548
(58) Field of Classification Search ......... 411/400–402, 411/482, 84, 411; 248/489, 549, 217.4
See application file for complete search history.

(56) References Cited

U.S. PATENT DOCUMENTS

| | | | | |
|---|---|---|---|---|
| 100,355 A | * | 3/1870 | Baumgartner | 24/694 |
| 154,429 A | * | 8/1874 | Thurston | 248/217.4 |
| 155,142 A | * | 9/1874 | Buss | 248/217.4 |
| D8,036 S | * | 2/1875 | Ray | D8/387 |
| 257,455 A | * | 5/1882 | Avery | 411/402 |
| 267,656 A | * | 11/1882 | Woodward | 248/217.4 |
| 270,177 A | * | 1/1883 | Broks | 411/402 |

(Continued)

FOREIGN PATENT DOCUMENTS

CA    2148088    1/1998

(Continued)

OTHER PUBLICATIONS

"Hangman Bear Claw Hanger" product information, www.hangmanstore/Hangman-Double-Headed-Bear-ClawTM-p/bck-bcd.htm, visited Mar. 10, 2008, copyright dated 2004, 3 pages.

*Primary Examiner*—Victor Batson
*Assistant Examiner*—Roberta Delisle
(74) *Attorney, Agent, or Firm*—Matthew W. Witsil; Moore & Van Allen, PLLC

(57) ABSTRACT

A device for supporting an article on a structure. The support device includes an elongate body with a head at one end, a neck, a shoulder flange, and an elongate threaded shank with threads extending therefrom. The head and/or neck may be arranged to engage the article, and the shoulder flange has a surface for engaging a corresponding surface of the structure. The elongate shank portion anchors the support device at a target site on the structure and tapers from a greatest diameter proximate to the shoulder flange to a pointed end. The initial taper is at a lesser angle to the longitudinal axis of the elongate body to a point where the angle increases, before which the threads may terminate.

10 Claims, 35 Drawing Sheets

U.S. PATENT DOCUMENTS

| | | | | |
|---|---|---|---|---|
| 316,650 | A | * | 4/1885 | Perkins .................. 411/400 |
| 394,637 | A | * | 12/1888 | Baker ........................ 223/88 |
| 440,899 | A | * | 11/1890 | Peden ..................... 248/267 |
| 449,887 | A | * | 4/1891 | Rogers .................... 411/411 |
| 635,297 | A | * | 10/1899 | Caldwell .................. 411/411 |
| 640,357 | A | * | 1/1900 | Baumgarten ............ 248/316.4 |
| 755,804 | A | * | 3/1904 | Smith ....................... 411/402 |
| 786,045 | A | * | 3/1905 | Metzger ................. 248/217.4 |
| 798,732 | A | * | 9/1905 | Kamen .................... 248/254 |
| 815,019 | A | * | 3/1906 | Kampfe ................... 248/546 |
| 842,933 | A | * | 2/1907 | Bement .................... 411/400 |
| 1,024,100 | A | * | 4/1912 | Recker .................... 411/402 |
| 1,114,135 | A | * | 10/1914 | Hafertep ................ 29/525.11 |
| 1,175,665 | A | * | 3/1916 | Sweet ...................... 411/403 |
| 1,201,295 | A | * | 10/1916 | Hendee ................. 248/217.4 |
| 1,202,518 | A | * | 10/1916 | Henwood .................. 248/207 |
| 1,250,597 | A | * | 12/1917 | Kyle ........................ 411/402 |
| 1,292,956 | A | * | 1/1919 | McConnal ................. 248/549 |
| 1,396,455 | A | * | 11/1921 | Moore ..................... 411/411 |
| 1,425,873 | A | * | 8/1922 | Lineaweaver ............ 411/480 |
| 1,537,039 | A | * | 5/1925 | Short ....................... 248/483 |
| 1,827,615 | A | * | 10/1931 | Rosenberg ............... 411/386 |
| 1,829,521 | A | * | 10/1931 | Katzman et al. ........... 248/466 |
| 1,934,752 | A | * | 11/1933 | Wilcox ....................... 470/11 |
| 2,139,332 | A | * | 12/1938 | Pittman et. al. ......... 174/161 R |
| 2,169,965 | A | * | 8/1939 | Niedermaier .............. 248/538 |
| 2,246,457 | A | * | 6/1941 | Schultz ..................... 403/217 |
| 2,385,296 | A | * | 9/1945 | Moore ..................... 248/74.1 |
| 2,411,629 | A | * | 11/1946 | Lane ....................... 411/400 |
| 2,438,436 | A | * | 3/1948 | Graves ..................... 248/490 |
| 2,600,974 | A | * | 6/1952 | Crawford ............... 244/135 B |
| 2,660,083 | A | * | 11/1953 | Tyson ...................... 411/396 |
| 3,228,738 | A | * | 1/1966 | Koffler .................... 206/284 |
| 3,298,655 | A | * | 1/1967 | Palm ........................ 248/498 |
| 3,387,814 | A | * | 6/1968 | Fischer .................... 248/507 |
| 3,451,362 | A |  | 6/1969 | Ostling et al. |
| 3,491,820 | A |  | 1/1970 | Ostling |
| 3,634,983 | A |  | 1/1972 | Welch |
| 3,645,162 | A |  | 2/1972 | Welch |
| 3,752,030 | A | * | 8/1973 | Steurer .................... 411/411 |
| 3,817,146 | A |  | 6/1974 | Scott |
| 3,871,609 | A | * | 3/1975 | Benjamin ................. 248/496 |
| 4,261,243 | A | * | 4/1981 | Palmer ..................... 411/510 |
| 4,310,193 | A | * | 1/1982 | Kolleas ..................... 296/75 |
| 4,332,205 | A |  | 6/1982 | Corl, Jr. |
| 4,470,716 | A |  | 9/1984 | Welch |
| 4,473,316 | A |  | 9/1984 | Welch |
| 4,601,247 | A |  | 7/1986 | Welch et al. |
| 4,615,554 | A | * | 10/1986 | Schilla et al. ................ 294/89 |
| 4,775,129 | A | * | 10/1988 | Gleisten ................... 248/493 |
| 4,892,429 | A | * | 1/1990 | Giannuzzi ................. 411/383 |
| 4,948,312 | A | * | 8/1990 | Jochum ....................... 411/5 |
| 5,059,077 | A | * | 10/1991 | Schmid .................... 411/400 |
| 5,118,061 | A | * | 6/1992 | Byrne et al. ............ 248/231.9 |
| 5,127,224 | A | * | 7/1992 | Barcza et al. ................ 60/763 |
| 5,308,203 | A |  | 5/1994 | McSherry et al. |
| 5,358,368 | A |  | 10/1994 | Conlan et al. |
| 5,371,994 | A | * | 12/1994 | Waters .................... 52/749.1 |
| 5,397,092 | A | * | 3/1995 | Black ....................... 248/490 |
| 5,549,234 | A | * | 8/1996 | Hong ....................... 227/119 |
| 5,558,479 | A |  | 9/1996 | McElderry |
| 5,588,788 | A | * | 12/1996 | Dominguez ............... 411/482 |
| 5,605,423 | A | * | 2/1997 | Janusz .................... 411/387.6 |
| 5,755,545 | A | * | 5/1998 | Banks ...................... 411/482 |
| 5,944,295 | A |  | 8/1999 | McSherry |
| 6,023,891 | A | * | 2/2000 | Robertson et al. ......... 52/125.4 |
| 6,036,149 | A | * | 3/2000 | Del Pino et al. ....... 248/231.91 |
| 6,109,819 | A |  | 8/2000 | Welch |
| 6,109,851 | A | * | 8/2000 | Bauer et al. .............. 411/411 |
| 6,345,472 | B1 | * | 2/2002 | Taylor ...................... 52/125.4 |
| 6,382,892 | B1 |  | 5/2002 | Hempfling |
| 6,419,436 | B1 | * | 7/2002 | Gaudron ................... 411/426 |
| 6,457,926 | B1 | * | 10/2002 | Pope ........................ 411/401 |
| 6,588,971 | B2 |  | 7/2003 | Welch et al. |
| 6,928,778 | B2 | * | 8/2005 | Schmid ....................... 52/363 |
| 7,001,124 | B2 |  | 2/2006 | Panasik et al. |
| 7,040,850 | B2 |  | 5/2006 | Gaudron |
| 2003/0007845 | A1 | * | 1/2003 | Gens ....................... 411/411 |
| 2003/0106980 | A1 | * | 6/2003 | Hui .......................... 248/489 |
| 2004/0094685 | A1 | * | 5/2004 | Janssen .................... 248/489 |
| 2004/0245422 | A1 | * | 12/2004 | Pollack ..................... 248/310 |
| 2005/0079027 | A1 |  | 4/2005 | Ernst et al. |
| 2006/0056938 | A1 | * | 3/2006 | Ernst et al. ................. 411/400 |
| 2006/0076849 | A1 | * | 4/2006 | Sedgwick et al. .......... 310/261 |

FOREIGN PATENT DOCUMENTS

| | | |
|---|---|---|
| CA | 2249891 | 4/2000 |
| CA | 2348939 | 5/2000 |
| CA | 2172789 | 8/2000 |
| CA | 2364076 | 7/2002 |
| WO | WO 02/250341 | 6/2002 |

\* cited by examiner

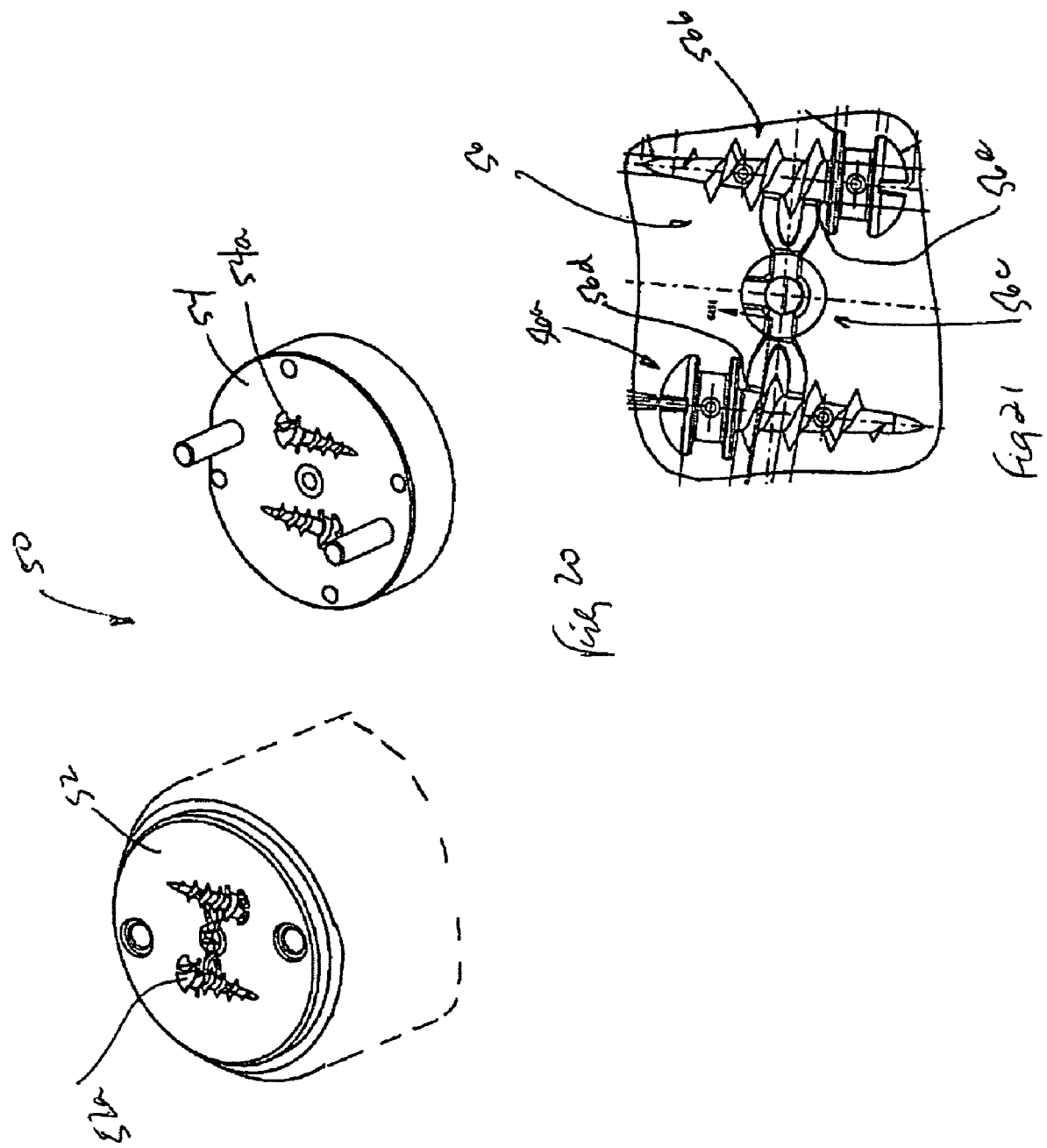

SUPPORTING DEVICE

REFERENCE TO CO-PENDING APPLICATIONS

The entire subject matter of U.S. Provisional application Ser. No. 60/626,776 filed Nov. 10, 2004 and entitled SUPPORTING DEVICE is incorporated by reference. The applicant claims priority benefit under Title 35, United States Code, Section 119(e) of U.S. Provisional application Ser. No. 60/626,776 filed Nov. 10, 2004 and entitled SUPPORTING DEVICE The applicant claims priority benefit under Title 35, United States Code, Section 119 of Canadian application serial number 2,484,381 filed Oct. 8, 2004 and entitled SUPPORTING DEVICE.

TECHNICAL FIELD

The invention relates to a supporting device and is especially applicable to a supporting device for supporting an article from a support structure.

BACKGROUND ART

Anchors have become increasingly popular for mounting objects where screws, nails, adhesives or other simple fasteners are either impractical or ineffective.

A problem with anchors is that they are difficult to install, which is particularly problematic for individuals who do not have the skills or tools for performing difficult installations. Moreover, many anchors on the market are instable and do not adequately support heavy loads, especially in dry wall. In addition, they may also loosen over time, causing damage to the support structure on which they are mounted.

SUMMARY OF THE INVENTION

The present invention seeks to eliminate, or at least mitigate, the disadvantages of the prior art, or at least provide an alternative.

According to one aspect, the present invention provides a support device for supporting an article on a structure, the support device comprising an elongate body having a support head portion located at one end thereof, the support head portion including a head and a shoulder flange, the head and shoulder flange being separated by a neck, the head and/or neck being arranged to engage the article, the shoulder flange having a surface for engaging a corresponding surface of the structure, the elongate body further comprising an elongate shank portion for anchoring the support device at a target site on the structure.

In an embodiment, the support head has a three dimensional polygonal shape.

In a further embodiment, the support head has a three dimensional spherical shape.

In an embodiment, the support head further includes one or more than one recess for receiving a torque tool for installing the support device at the target site on the structure. The head of the support head portion includes a recess extending therein for engaging an installation tool. The recess has a slot, cruciform, star, rectangular or square shaped or a combination thereof.

In a preferred embodiment, the support head portion has a transverse passage located in the neck extending therethrough, to accommodate a torque tool. Preferably, the transverse passage is located in the neck.

In an embodiment, the installation tool includes a distal end for engaging the transverse passage and is preferably arranged to be hand held.

In an embodiment, the support device further comprises a support accessory engageable with the support head portion and being arranged to support the article at a location proximal or distal to the support head. The support accessory includes an anchor formation for engaging the neck and a support formation spaced from the anchor formation and including the support surface. In one example, the anchor formation includes a hook portion, but can be or include other arrangements or shapes as desired.

In a further embodiment, the elongate shank is screw threaded having a proximal end adjacent the support end and a distal end, and the shank portion decreases in cross-section from the proximal end to the distal end.

In an embodiment, the shank portion is adapted for insertion into the target site of the structure, the structure material including wood, plastic, fiberglass, paper, drywall, gypsum, cardboard, concrete, brick, steel or a combination thereof.

In an embodiment, the support head portion includes indicia of a pre-determined design theme.

In an embodiment, the indicia of a pre-determined design theme is on a paper, or a metal substrate attached to the support head portion.

In an embodiment, the indicia of a pre-determined design theme is in the form of an insignia insert.

In an embodiment, pre-determined design theme is on a removable cap positioned over the head portion of the support head.

In a further embodiment, the support head portion includes a relatively smooth, rough and/or textured outer surface.

In a further embodiment, the support device is made of a material having sufficient strength to support the weight bearing load of at least one kilogram in weight.

In an embodiment, the material of the support device is made of a plastic.

In a preferred embodiment, the material of the support device is made of a metal.

According to a further aspect, the present invention provides kit comprising a support device and a torque tool for anchoring the support device into a target site of a structure, the support device including an elongate body having an axially aligned support head portion located at one end of the body, the support head portion including a head, a neck extending away from the head and towards a shoulder flange integrally operable with the head and/or neck to support a weight bearing load; and an elongate shank portion integrally formed with the shoulder flange for anchoring the support device into a target site of the structure, the shank portion projecting away from the support head portion and integrally formed therewith to secure the support device in the target site.

In an even further aspect, the present invention provides a mold for use in the manufacture of one or more than one support device, said support device comprising the support device including an elongate body having an axially aligned support head portion located at one end of the body, the support head portion including a head, a neck extending away from the head and towards a shoulder flange integrally operable with the head and/or neck to support a weight bearing load; and an elongate shank portion at another end of the body and integrally formed with the shoulder flange for anchoring the support device into a target site of the structure, the shank portion projecting away from the support head portion and integrally formed therewith to secure the support device in the target site.

In still a further aspect, the present invention provides a method of supporting an article on a structure, comprising the steps of providing a support unit with an elongate body having a support head portion located at one end thereof, providing the support head portion with a head and a shoulder flange, the head and shoulder flange being separated by a neck, installing the support unit into the structure with the shoulder flange engaging an outer surface of the structure, with the neck and head exposed from the structure, and orienting the article so that a portion thereof engages the neck and/or the head.

In one embodiment of the method, the structure is a wall.

BRIEF DESCRIPTION OF THE DRAWINGS

FIGS. 1a, 1b, 1c, are sectional, perspective and side views of a support device;

FIGS. 20 and 21 are fragmentary perspective and plan views of a mold and a blank therefrom.

DETAILED DESCRIPTION OF THE PREFERRED EMBODIMENTS

Figure 1A:
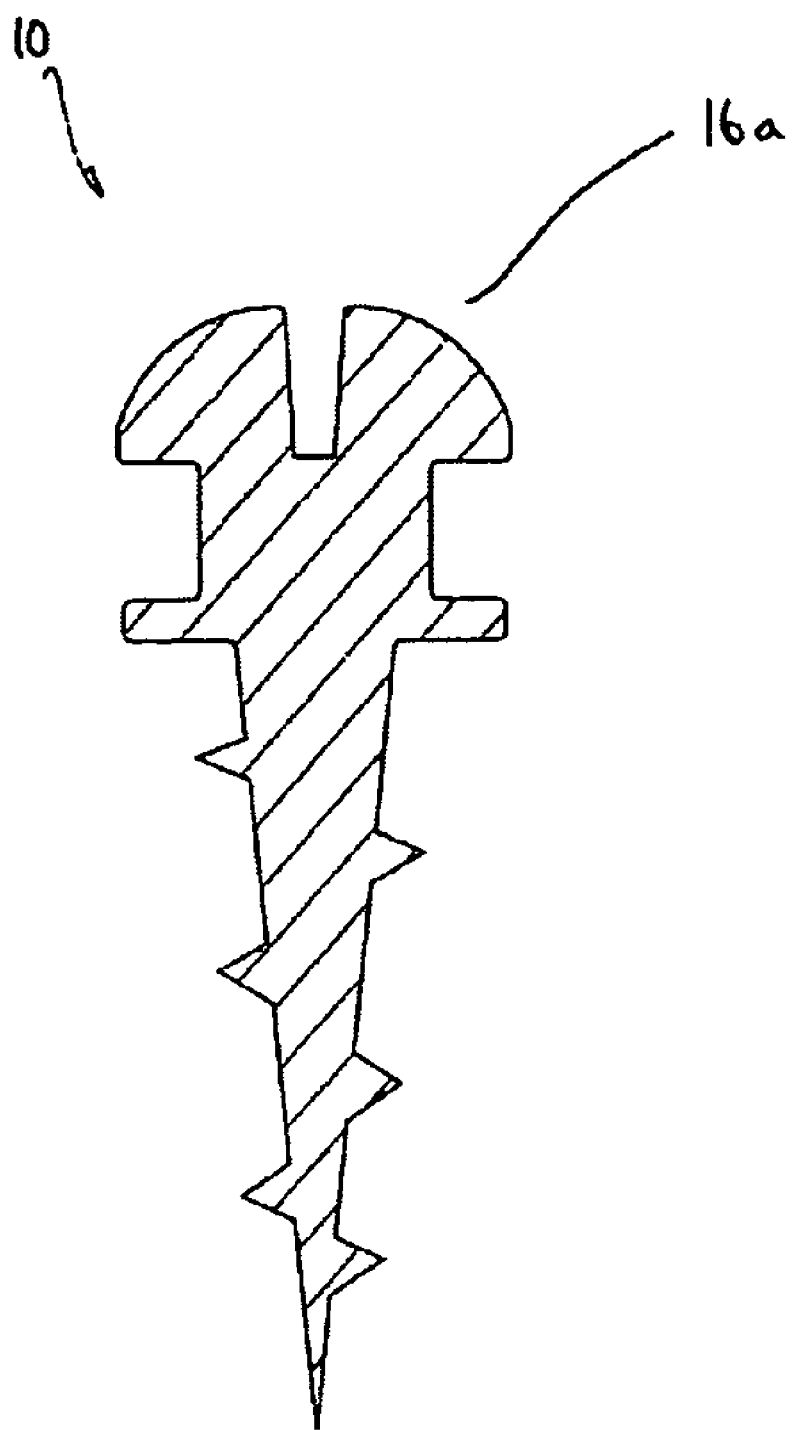
Figure 1B:
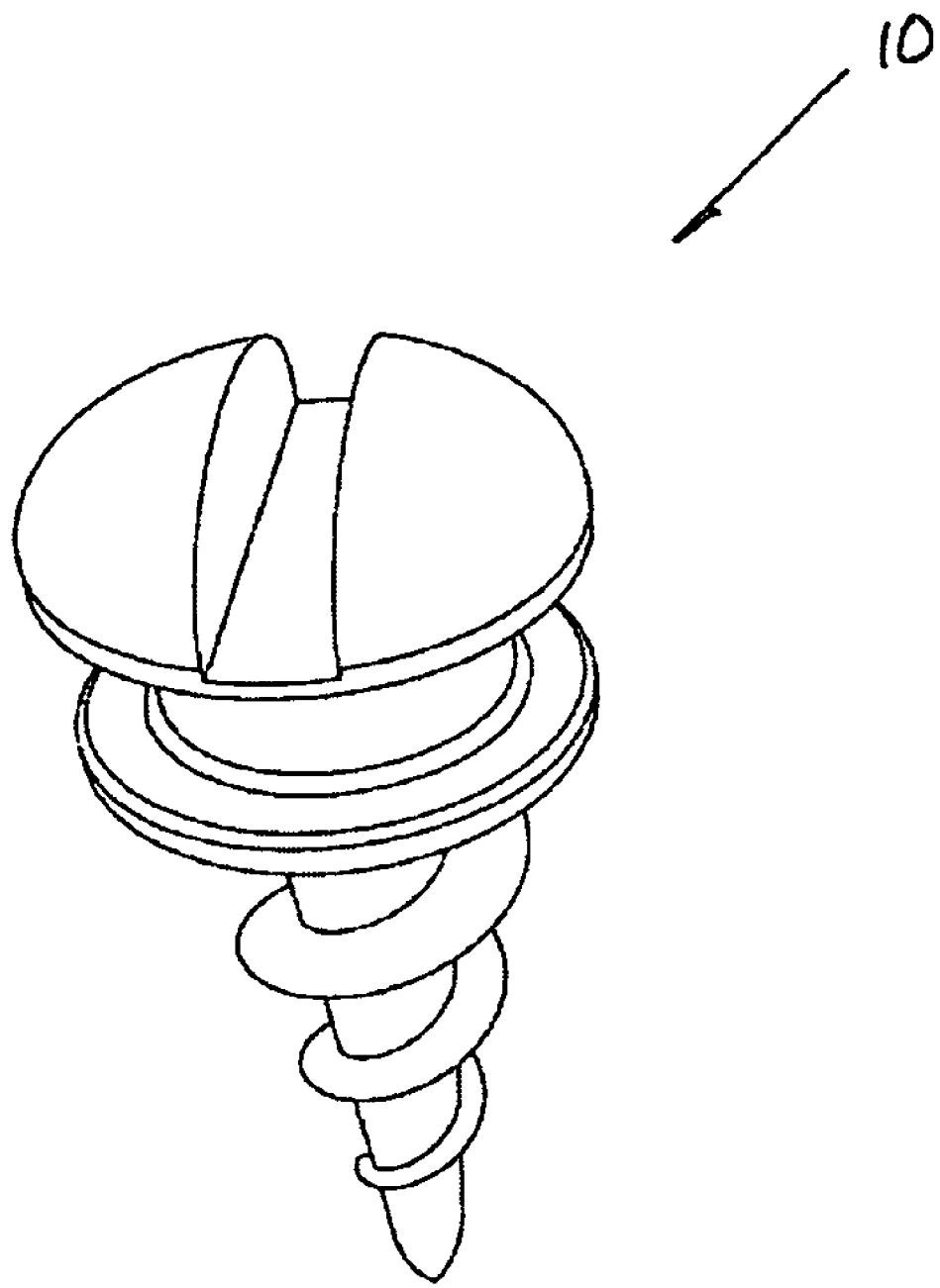
Figure 7C:
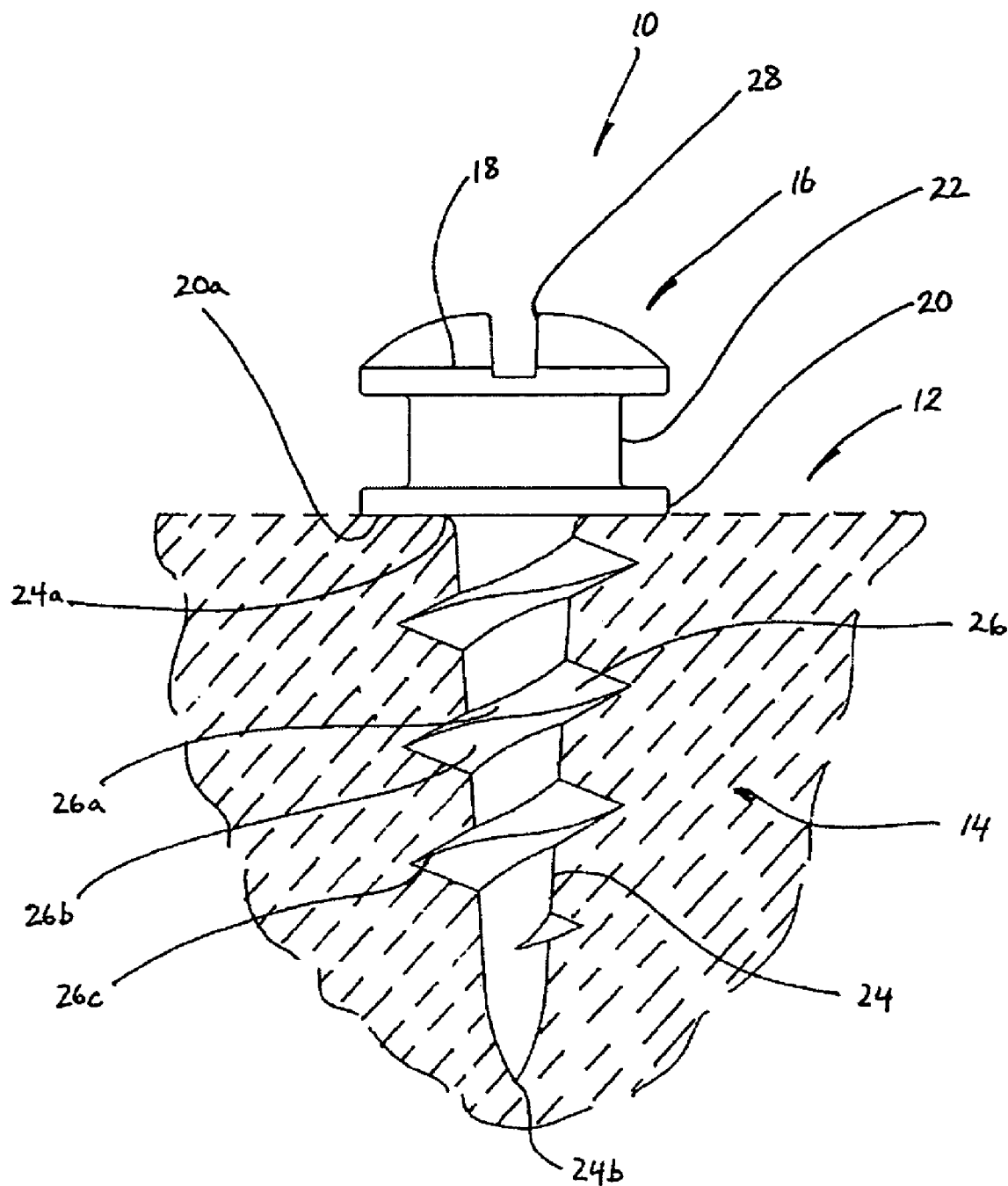
FIGS. 5 through 14 are views of still other support devices.

Referring to the figures, particularly FIGS. 1a to 1c, there is shown a support device 10 for supporting an article (such as, for example, a picture frame, not shown) on a structure, for example a wall 12. The support device 10 has an elongate one piece body 14 having a support head portion 16 located at one end thereof. The support head portion 16 includes a head 18 and a shoulder flange 20 which are separated by a neck 22.

As will be described, the head 18 and/or neck 22 are arranged to engage the article while the shoulder flange 20 has a surface 20a for engaging a corresponding surface of the structure.

The elongate body 14 has an elongate shank portion 24 for anchoring the support device at a target site on the structure. The elongate shank portion is, in this example, screw threaded with a proximal end 24a adjacent the shoulder flange 20 and a distal end 24b, and the shank portion 24 decreases in cross-section from the proximal end to the distal end 24b.

Preferably, the elongate shank portion 24 has a helical thread 26 extending along its surface. The thread 26 has two surfaces 26a, 26b extending along its length which converge toward one another to form an edge 26c. The height of the thread, which is measured from a point on the edge to an adjacent point on the surface of the shank, diminishes progressively from an end of the thread adjacent to the support head portion to an end of the thread adjacent to the tip of the shank. Other thread configurations may be used as desired.

Of course, the elongate shank portion 24 may be of other configurations, as desired. Desirably, the elongate shank portion 24 is adapted for insertion into the target site of the structure 12, which may include wood, plastic, and paper, cardboard, concrete, brick, steel or a combination of those materials. The support device 10 is also desirably made of a material with sufficient strength to support the weight bearing load of at least one kilogram in weight, though other weights may also be suitable, as desired. A most preferred form of material for the support device 10 is metal, such as alloys of aluminum, copper, steel magnesium, and zinc.

Figure 15:
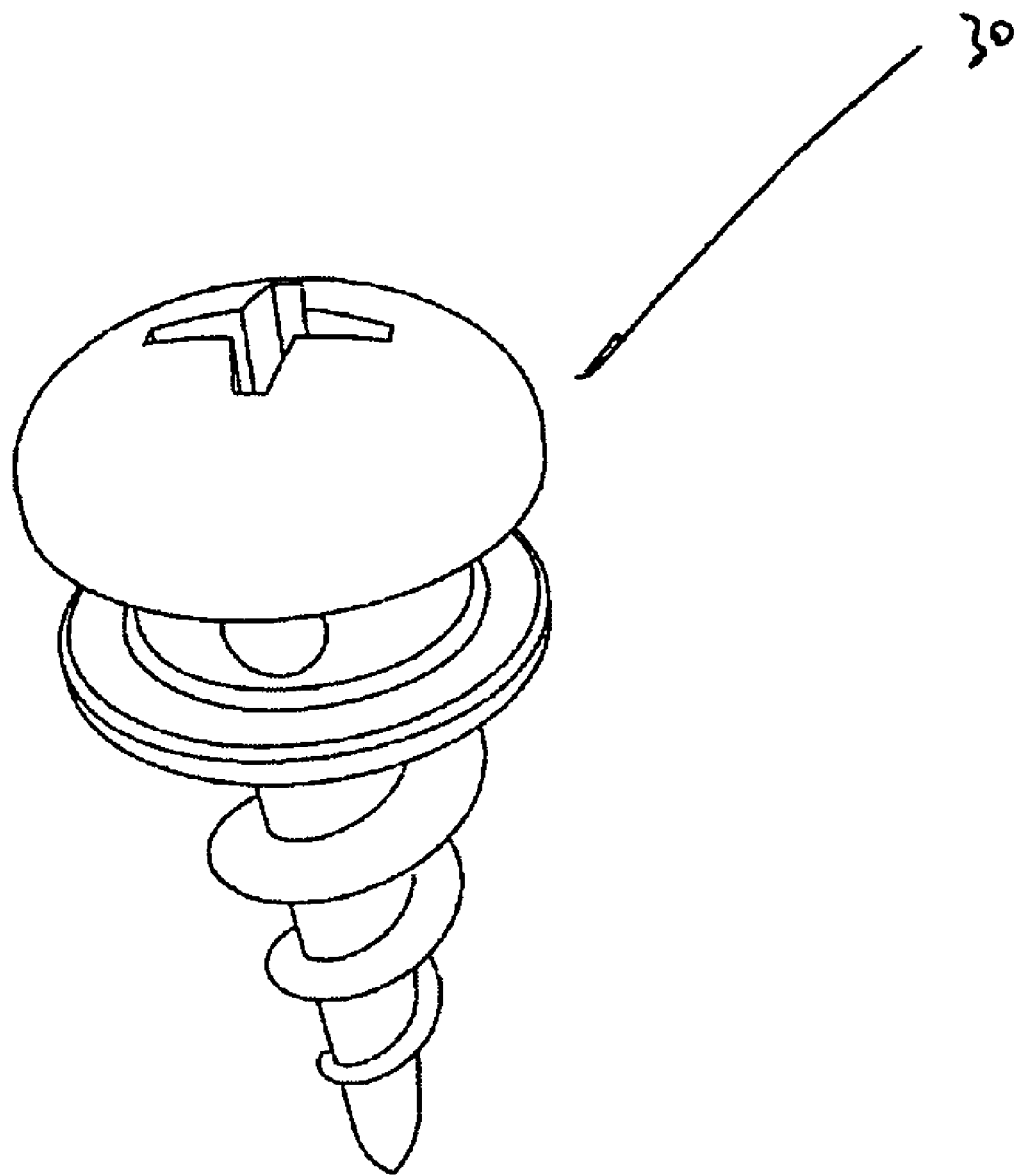
FIGS. 15 and 16, are perspective views of further support devices with an engaging recess in each head of the device.
Figure 16:
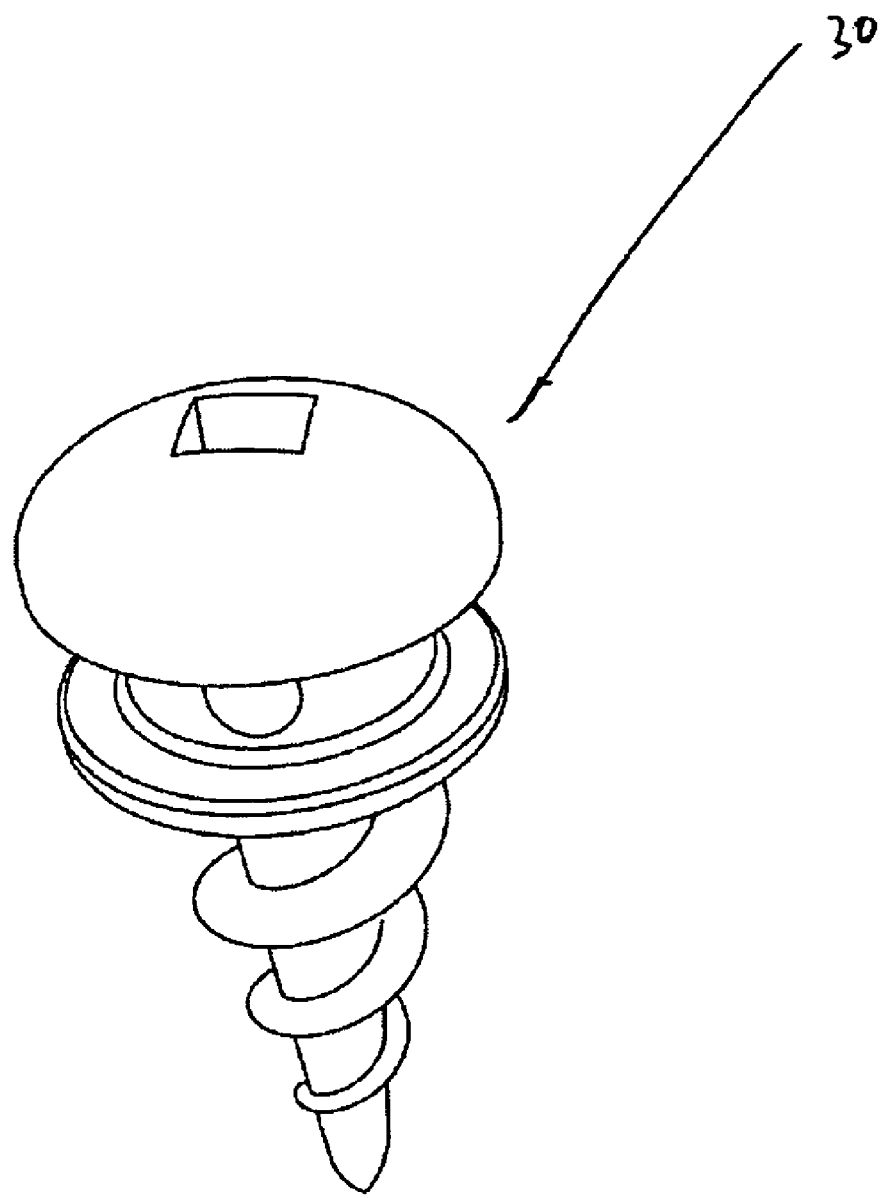
Figure 17:
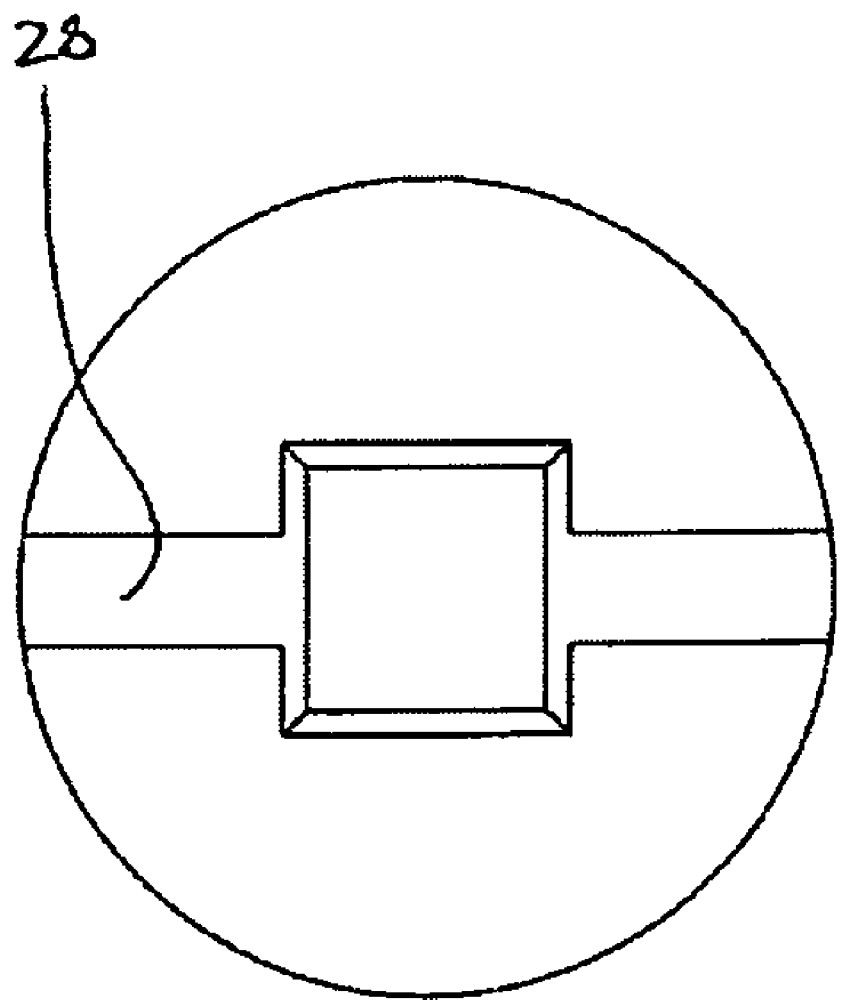
FIGS. 17, 17a, 18 and 18a are plan views of heads of further support devices.
Figure 17A:
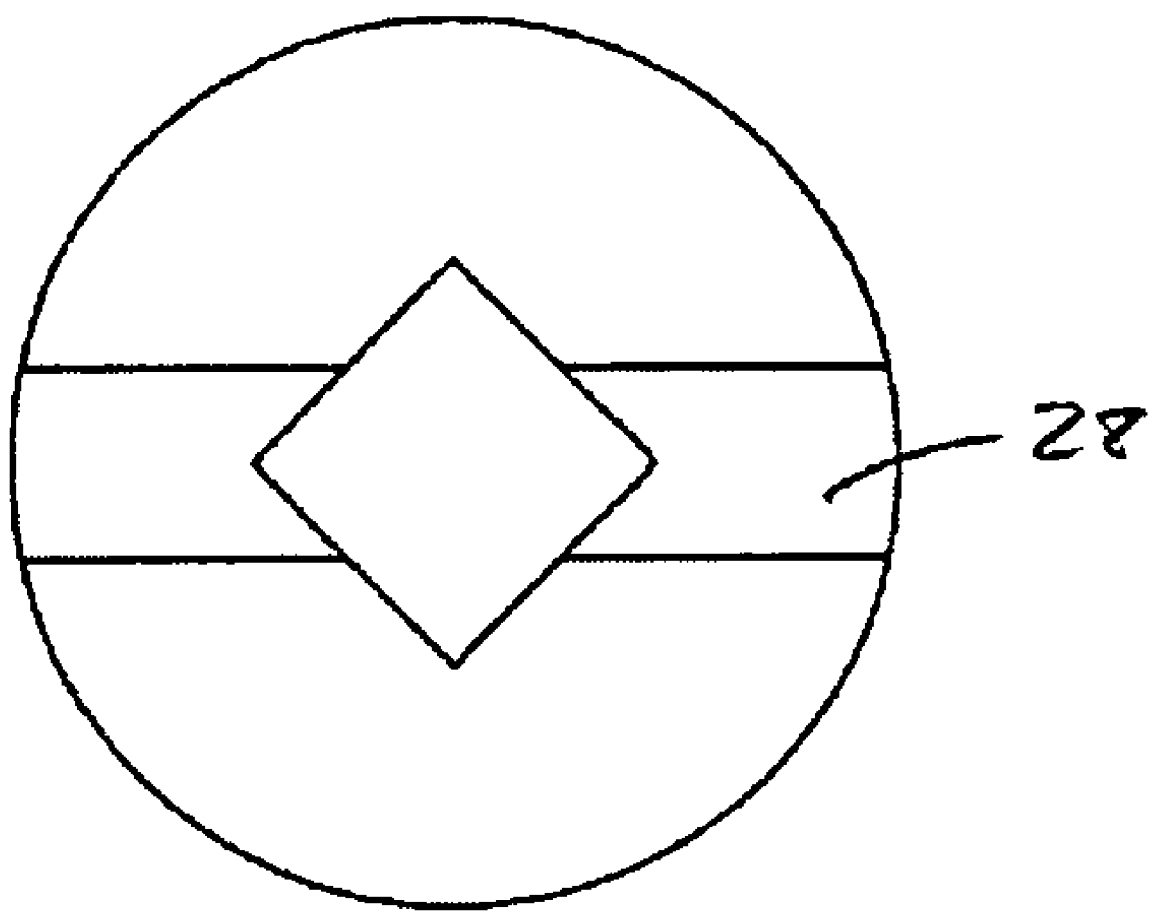
Figure 18:
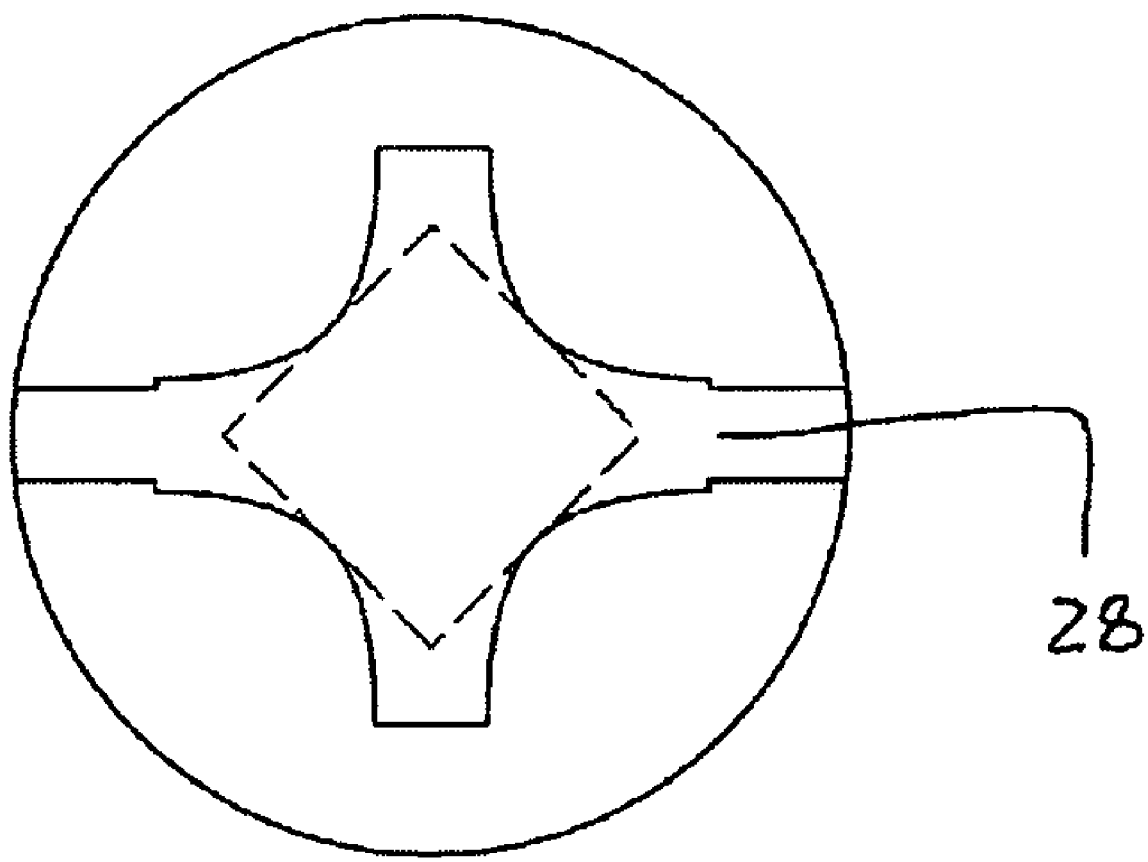
Figure 18A:
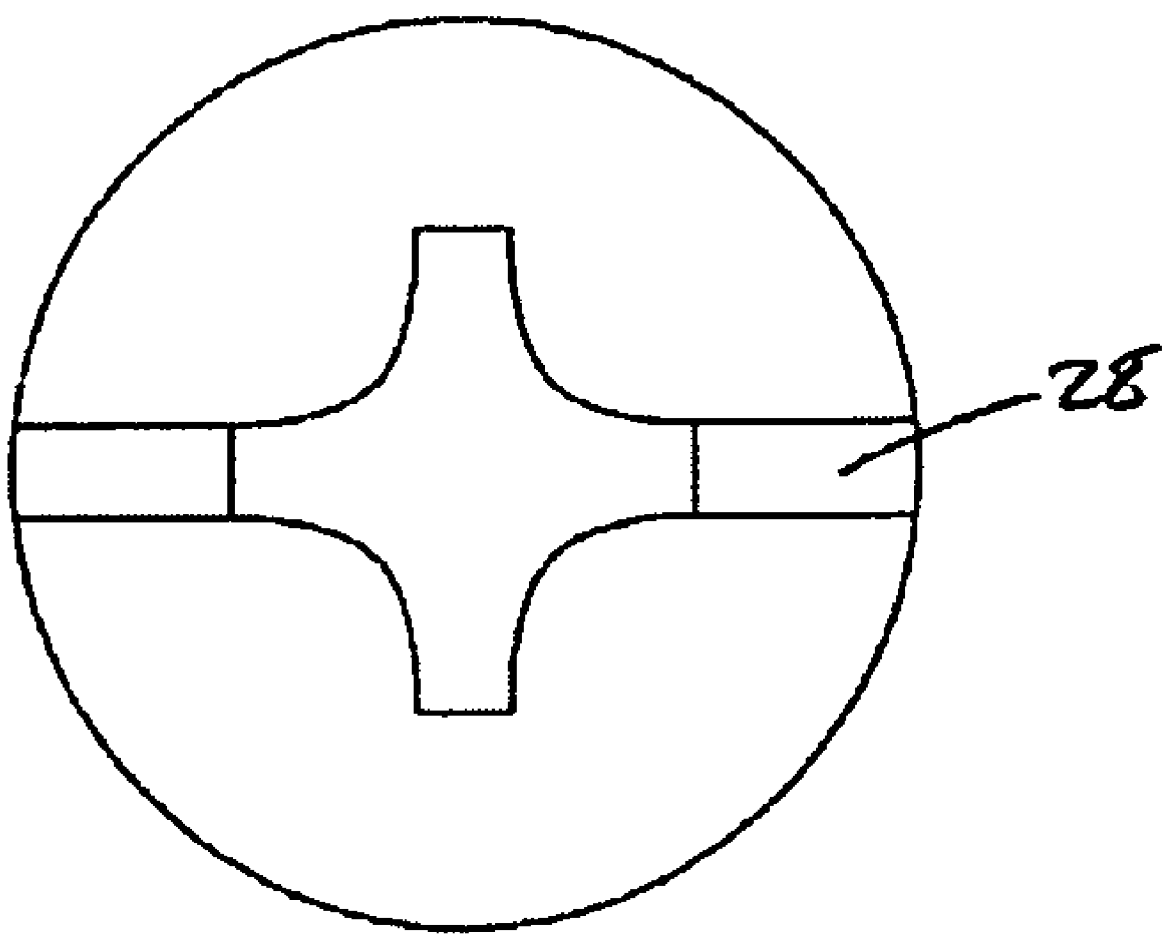

The support head 16, in this case, has a polygonal shape in three dimensions. The support head 16 the support head is provided with a curved outer upper surface 16a to form a "button head" and is further provided with one or more than one recess for receiving a torque tool, such as a screw driver, a knife or the like (not shown), for installing the support device 10 at the target site on the structure 12. In this case, the recess 28 for engagement of the installation tool 36 may be slotted as shown but may be of other shapes. For instance, the recess may be in the form of a cruciform, star, rectangular or square shape or a combination thereof as shown in FIGS. 15 through to 18a.

Figure 9:
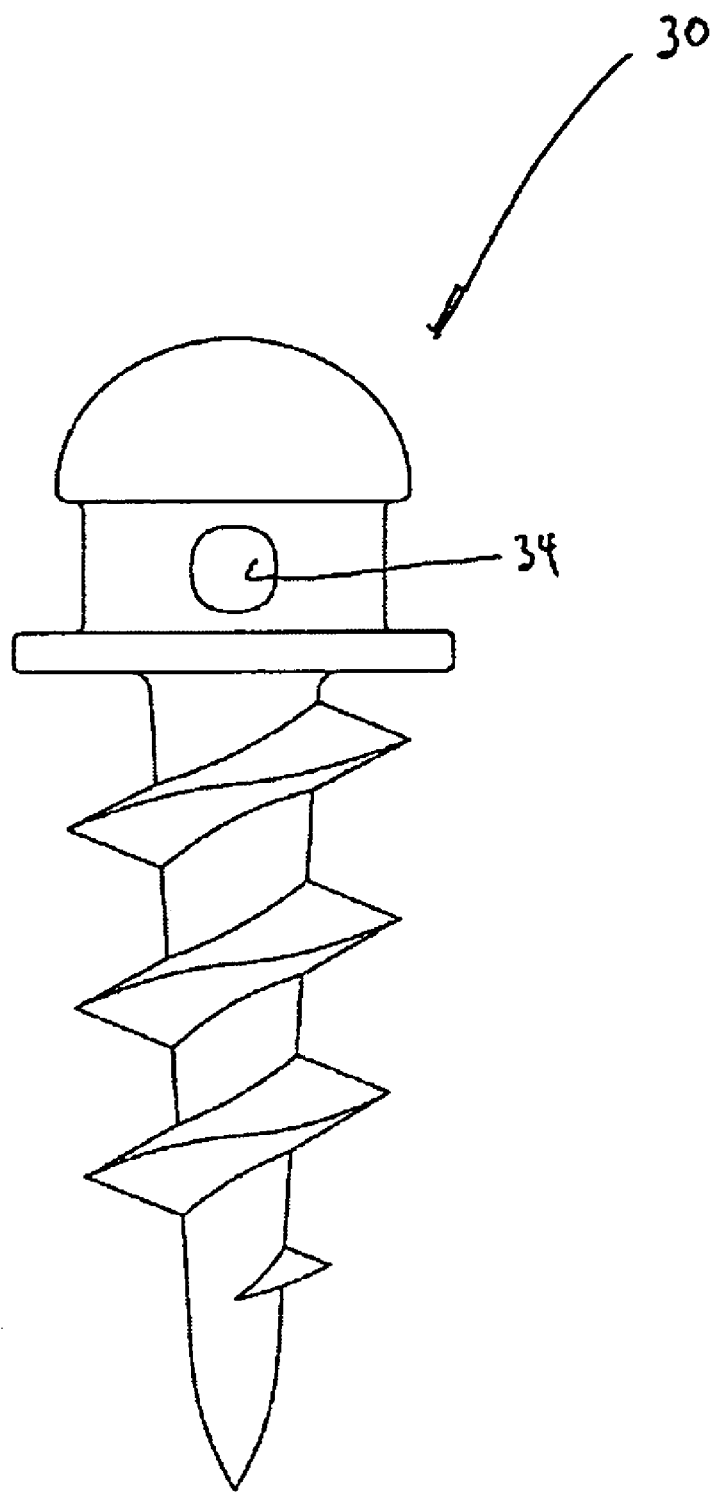
Figure 10:
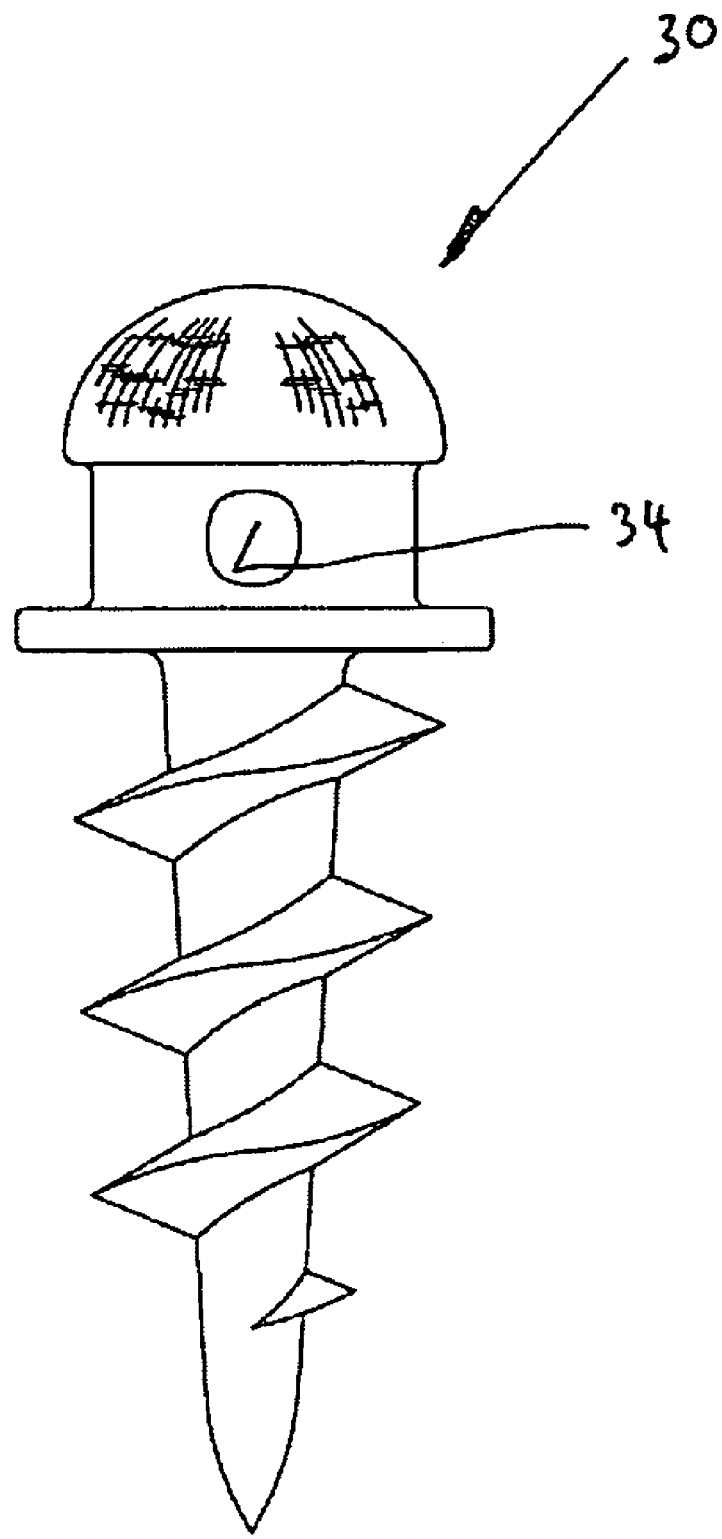
Figure 11:
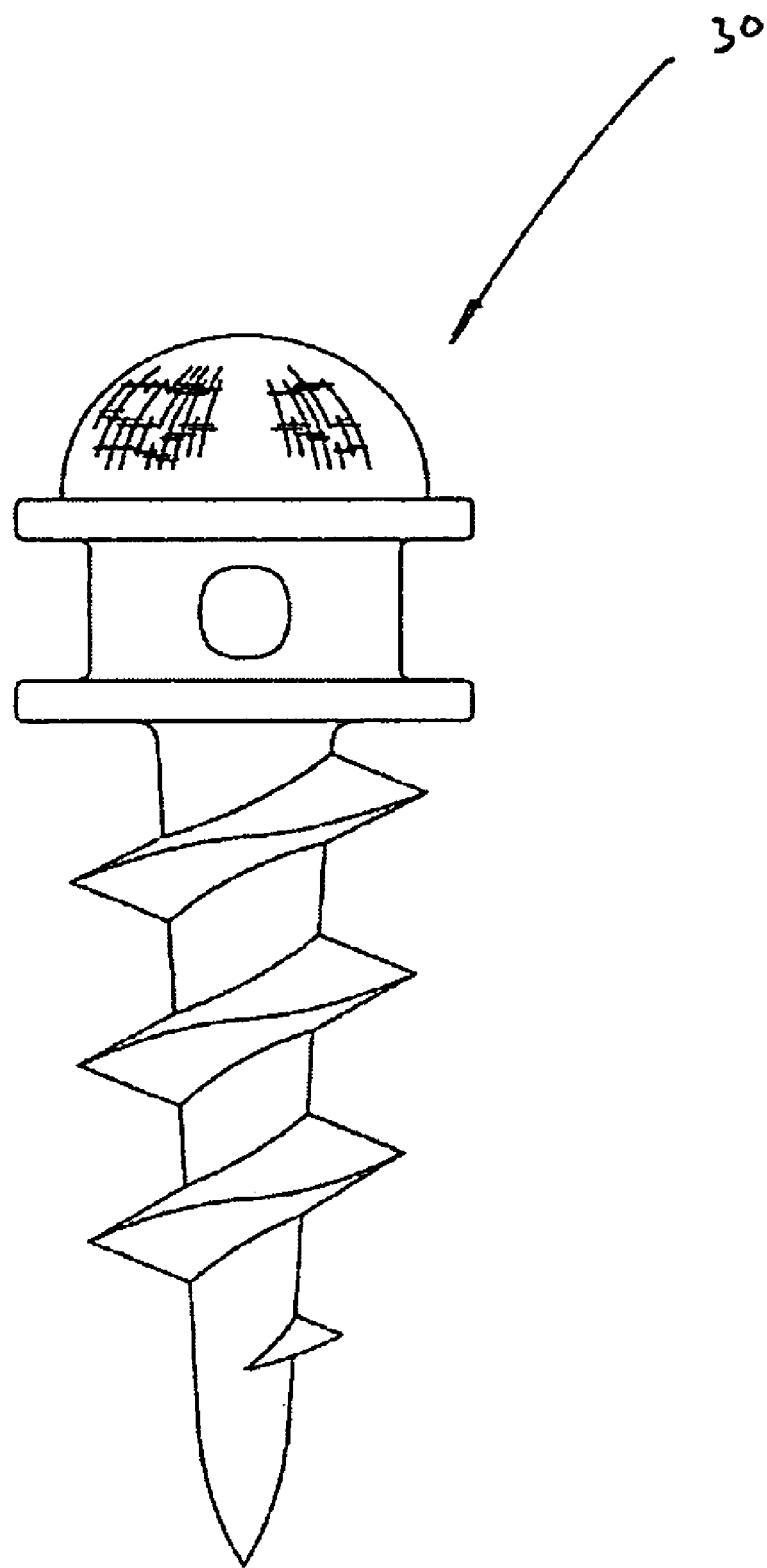
Figure 12:
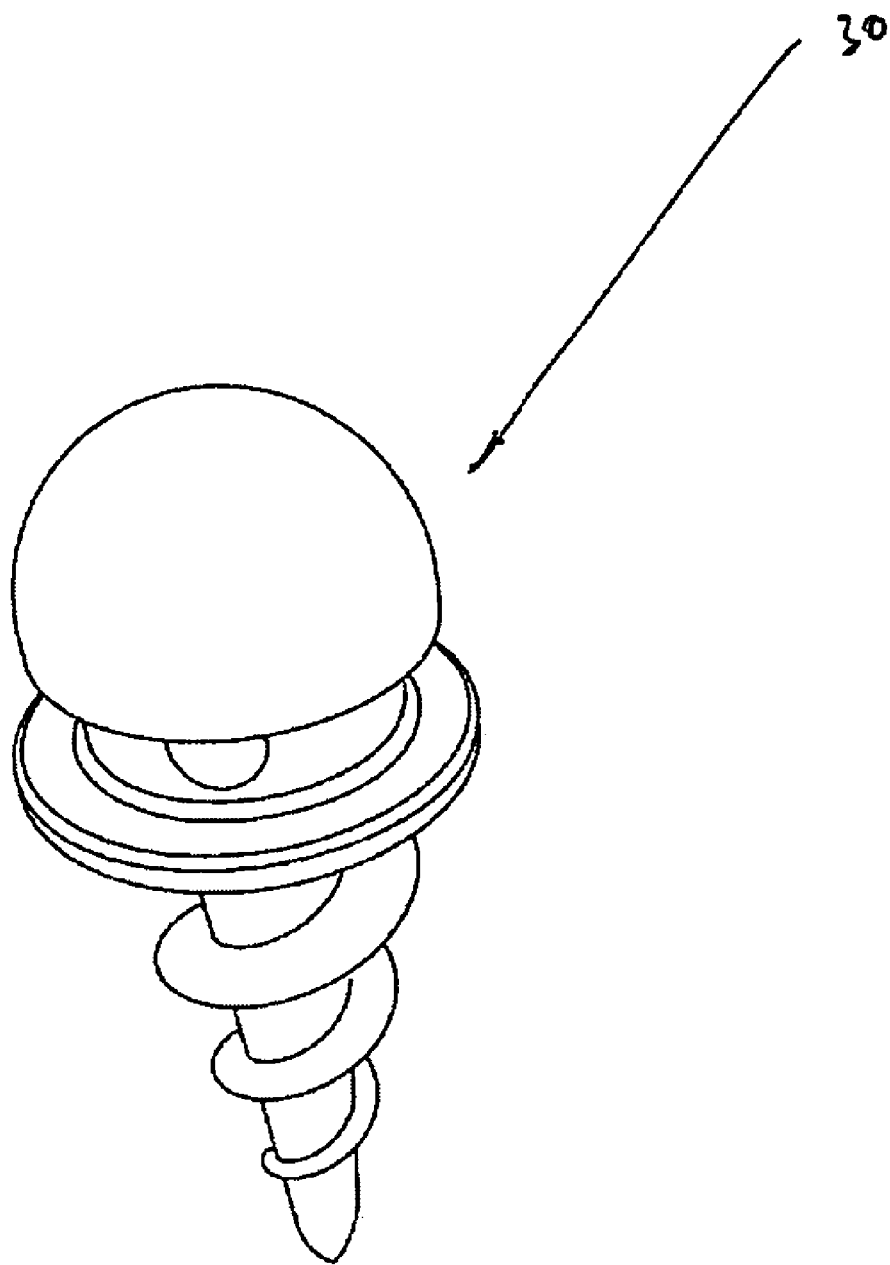
Figure 13:
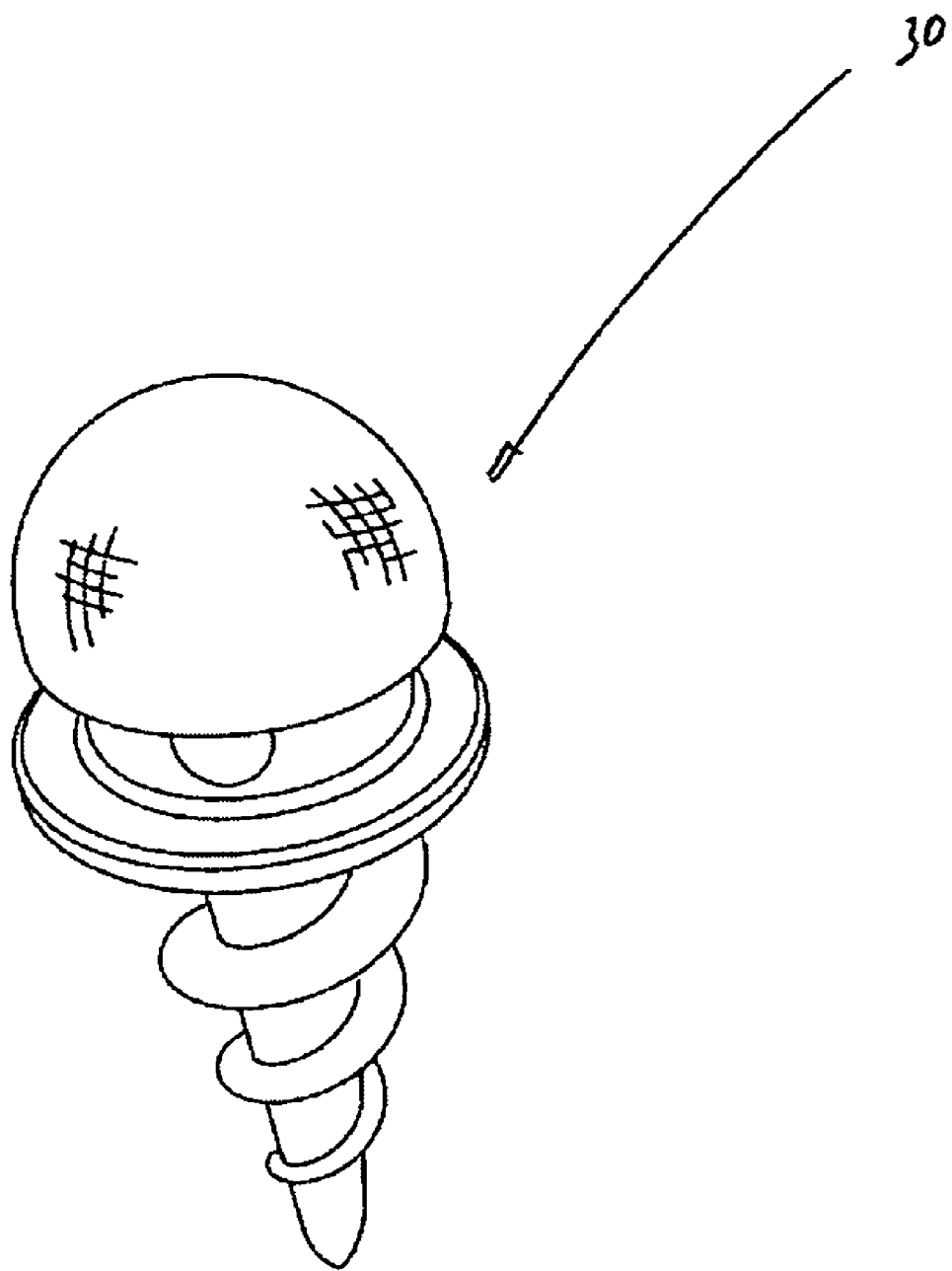
Figure 14:
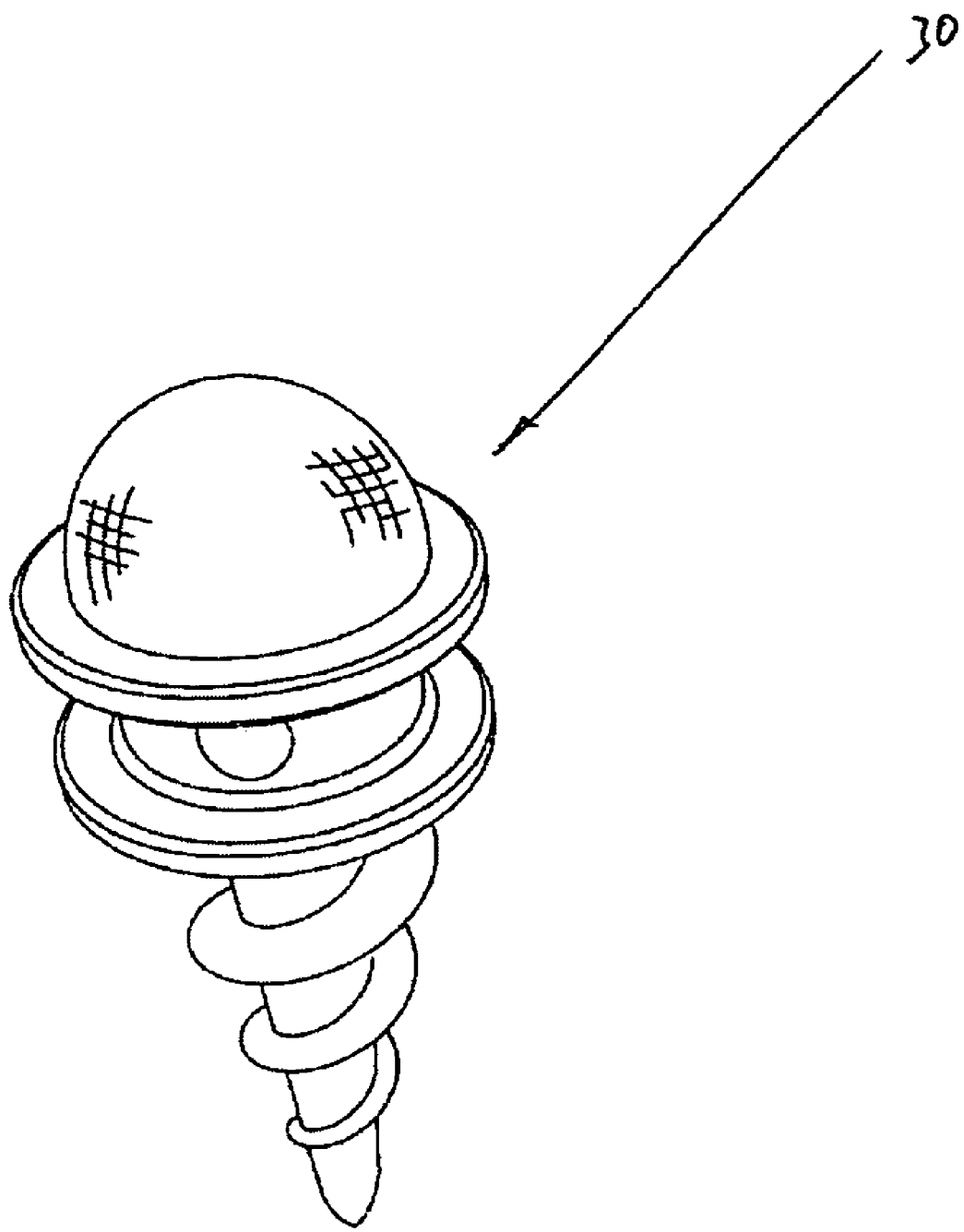

The support head may have a slotted upper surface 16a when viewed in cross section (as shown in FIG. 1a), but may also be flat if desired. The upper surface 16a may also be curved with relatively wide or relatively narrow undulations, the latter in a corrugated form (not shown). Still further, the upper surface 16a may be patterned, textured (as shown in selected ones of FIGS. 5 and 9 through to 15) or otherwise provided with indicia of a predetermined design theme, to present a clean esthetically pleasing outer surface to be complementary with the décor of the vicinity of the structure.

Referring to FIGS. 2a to 2g, another support device 30 has a neck 32 provided with a transverse passage 34 extending therethrough for engaging an installation tool 36. As with the above mentioned torque tool, the installation tool 36 may be arranged to be hand held.

As seen in FIGS. 2d, 2e, 2f, and 2g, the support device 30 may also be conveniently used with a support accessory 38 which also functions as the installation tool 36. The support accessory 38 is engageable with a support head portion 40 and is arranged to support an article at a location proximal or distal to the support head portion 40. In this case, the support accessory 38 includes an anchor formation having a looped portion 42 for engaging the neck 32 and a hooked support formation 44 spaced from the anchor formation 42 and including a support surface 44a. The support accessory 38, in this example, can be described as a support hook.

Figure 3A:
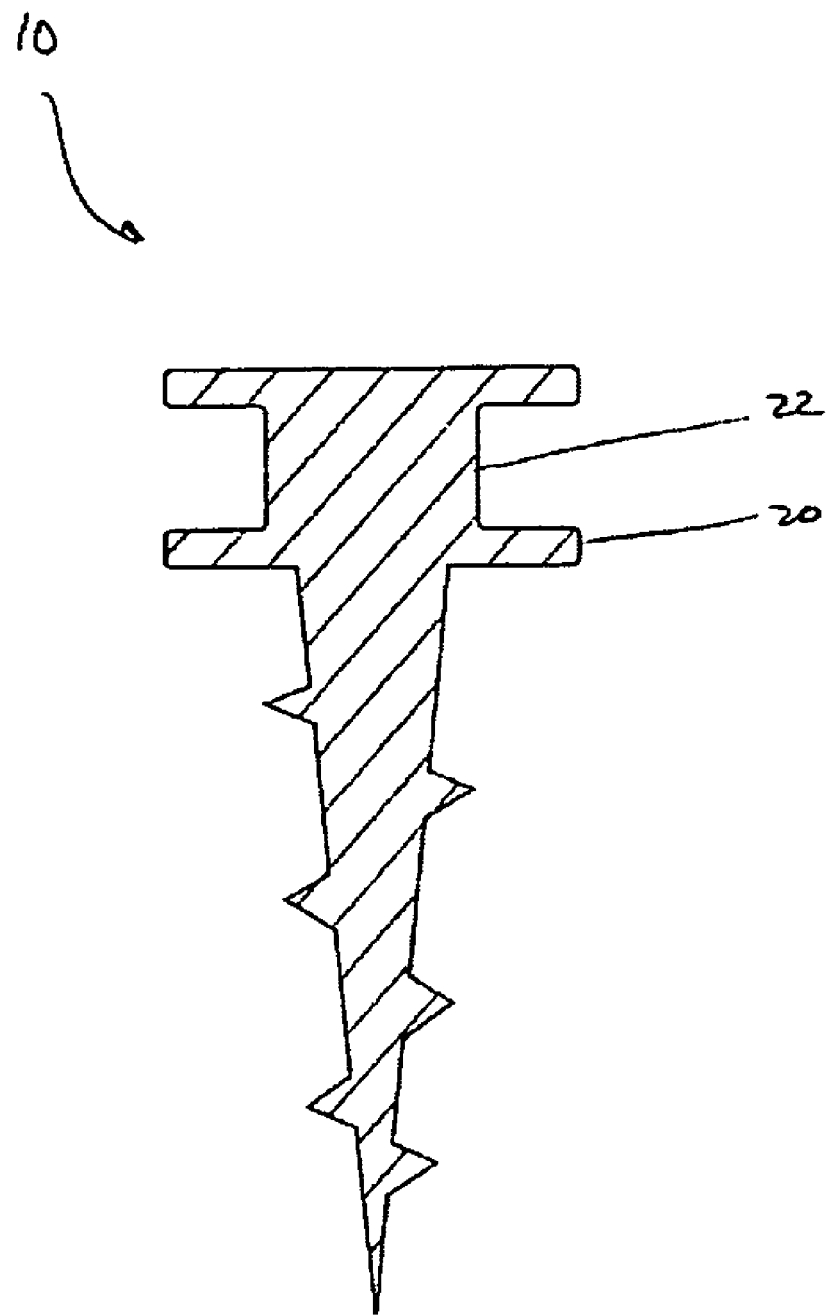
FIGS. 3a and 3b are sectional and side views of another support device.
Figure 3B:
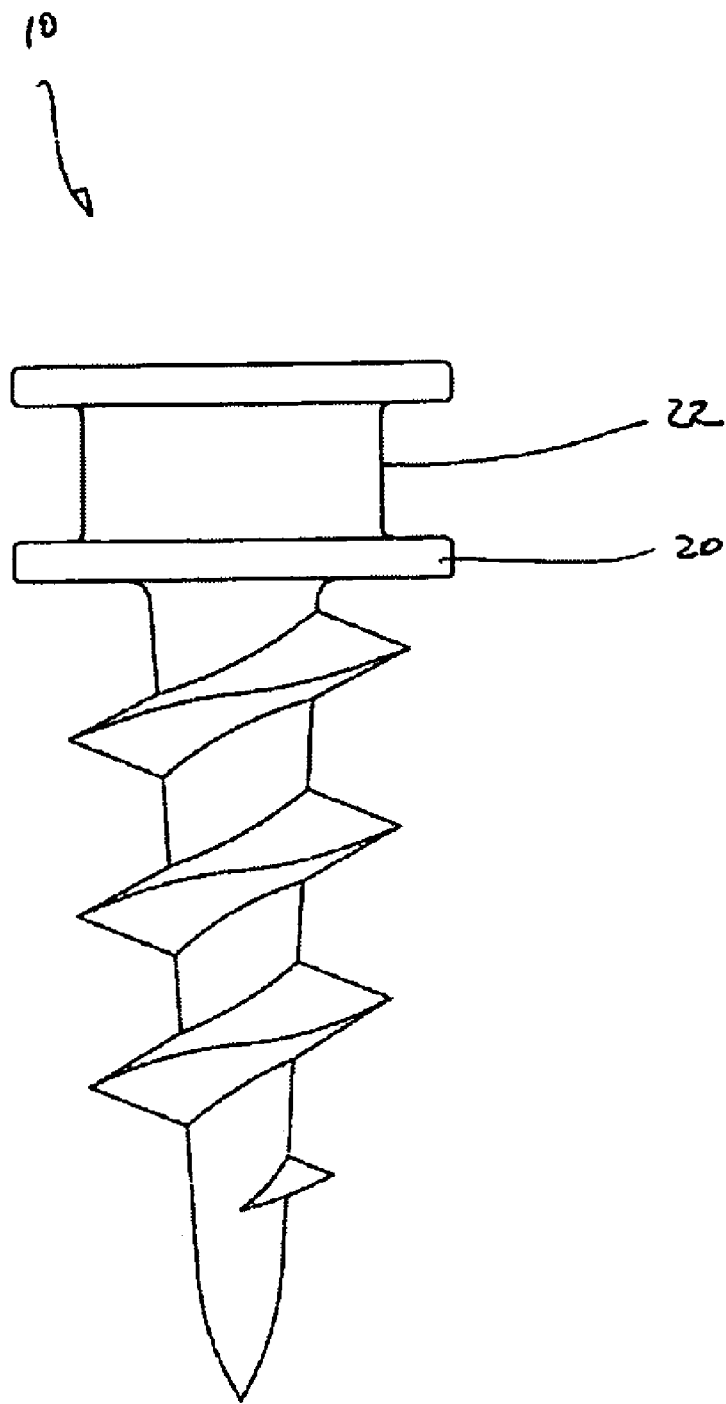
Figure 4A:
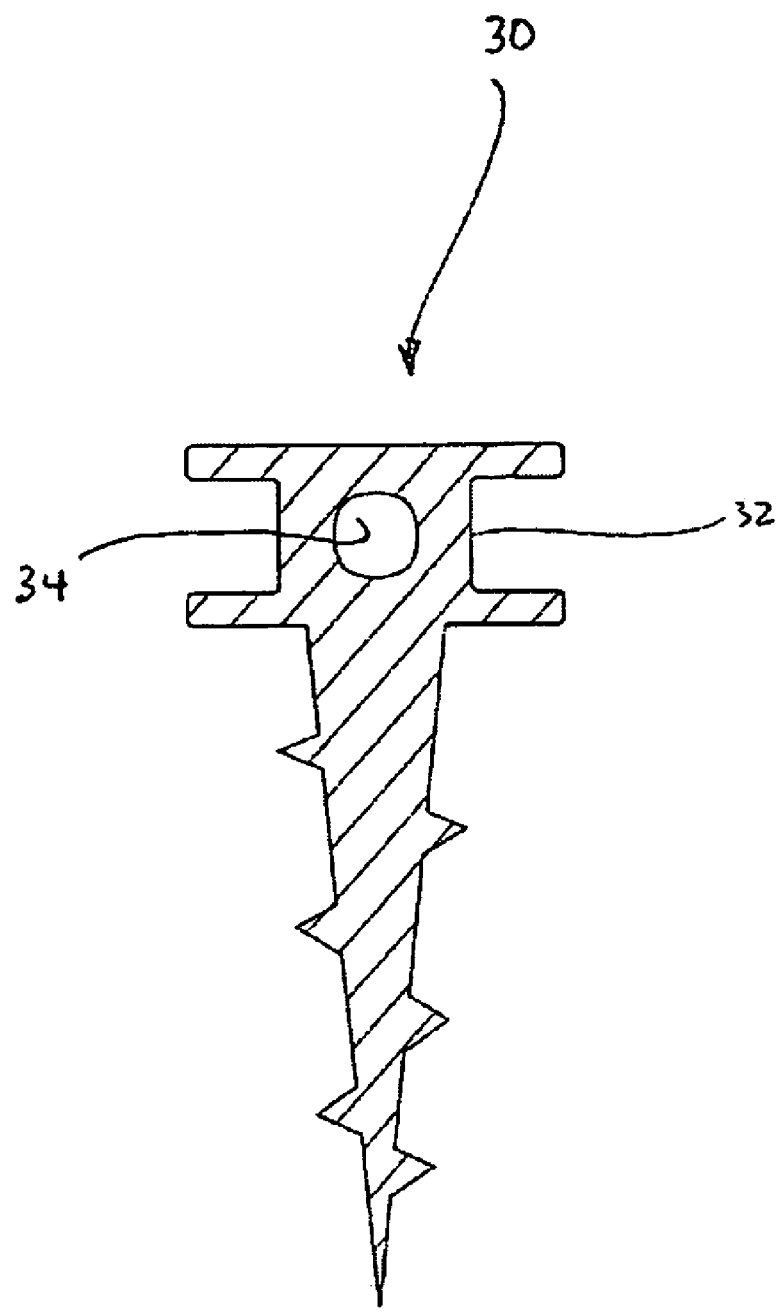
FIGS. 4a and 4b are sectional, side and perspective views of still another support device.
Figure 4B:
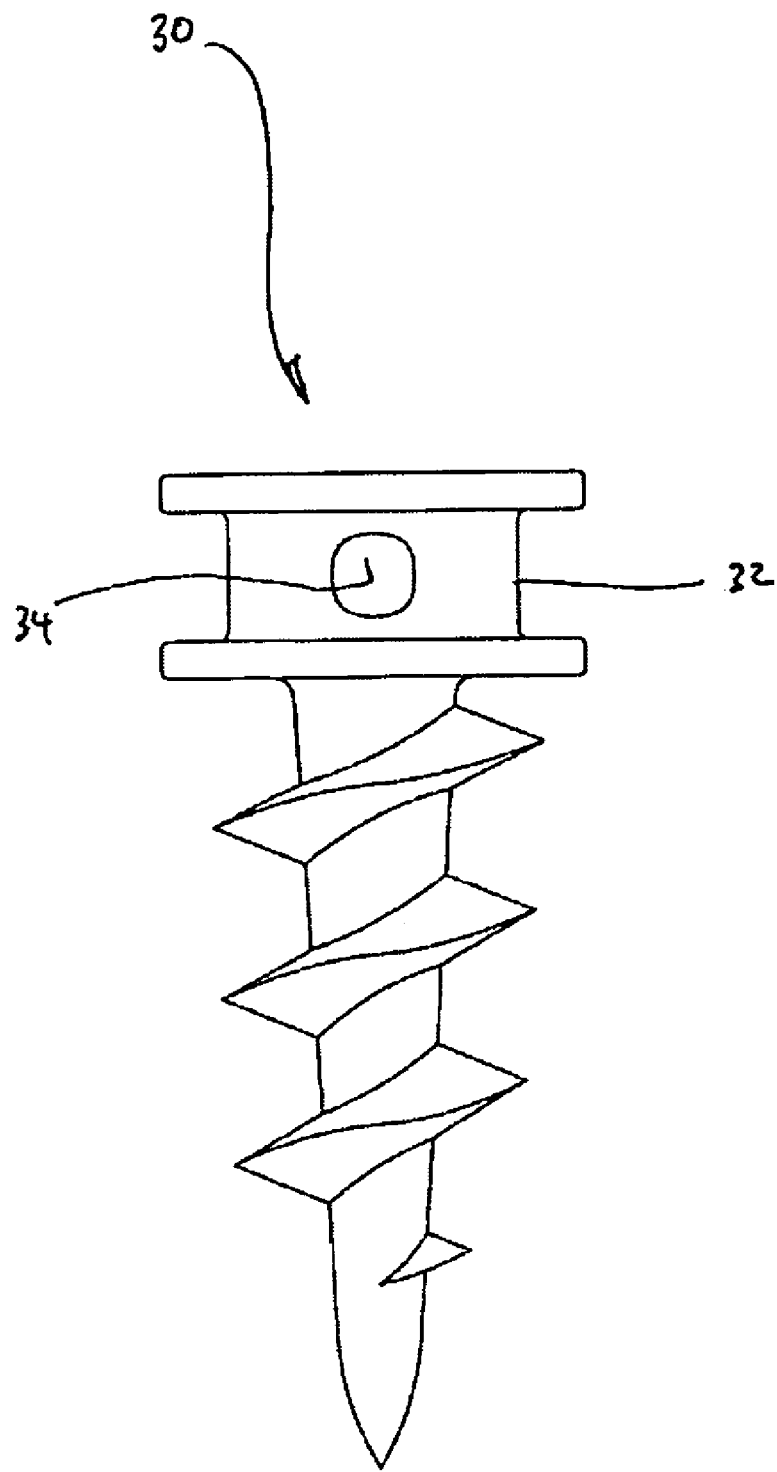
Figure 5:
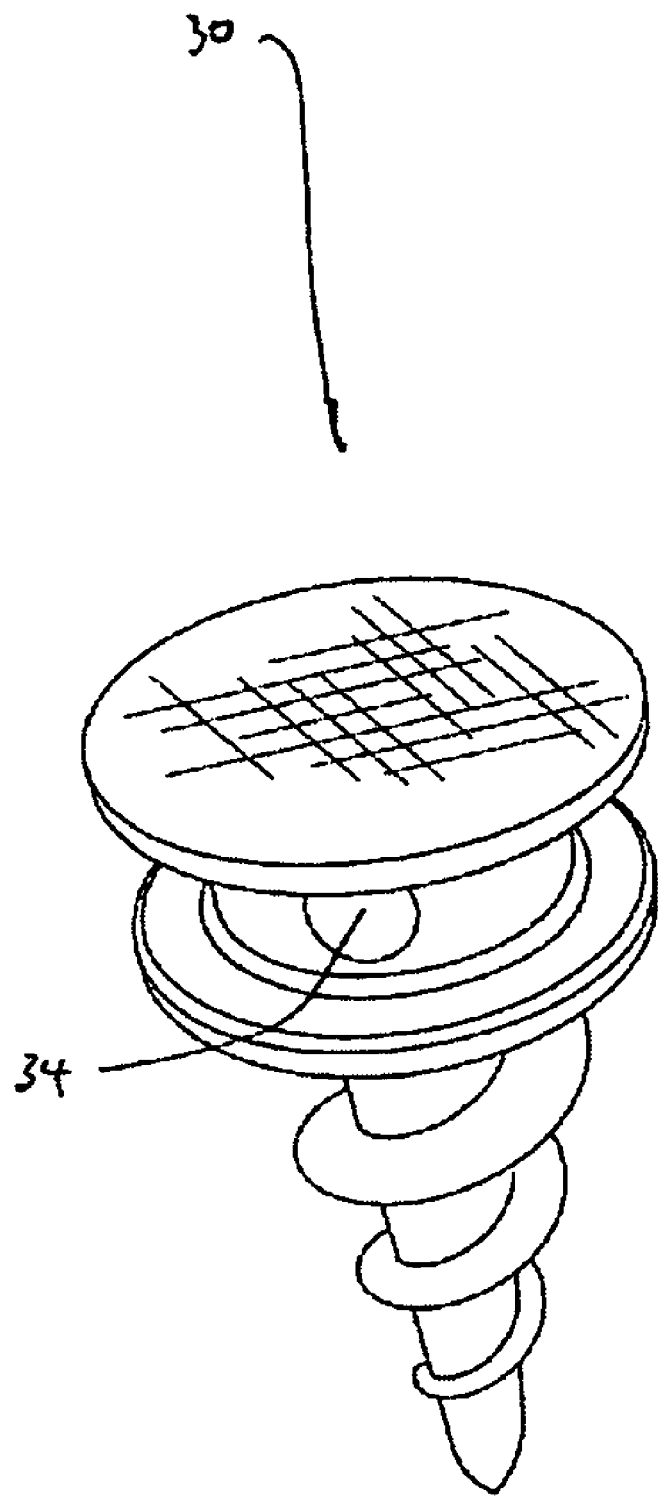
Figure 6:
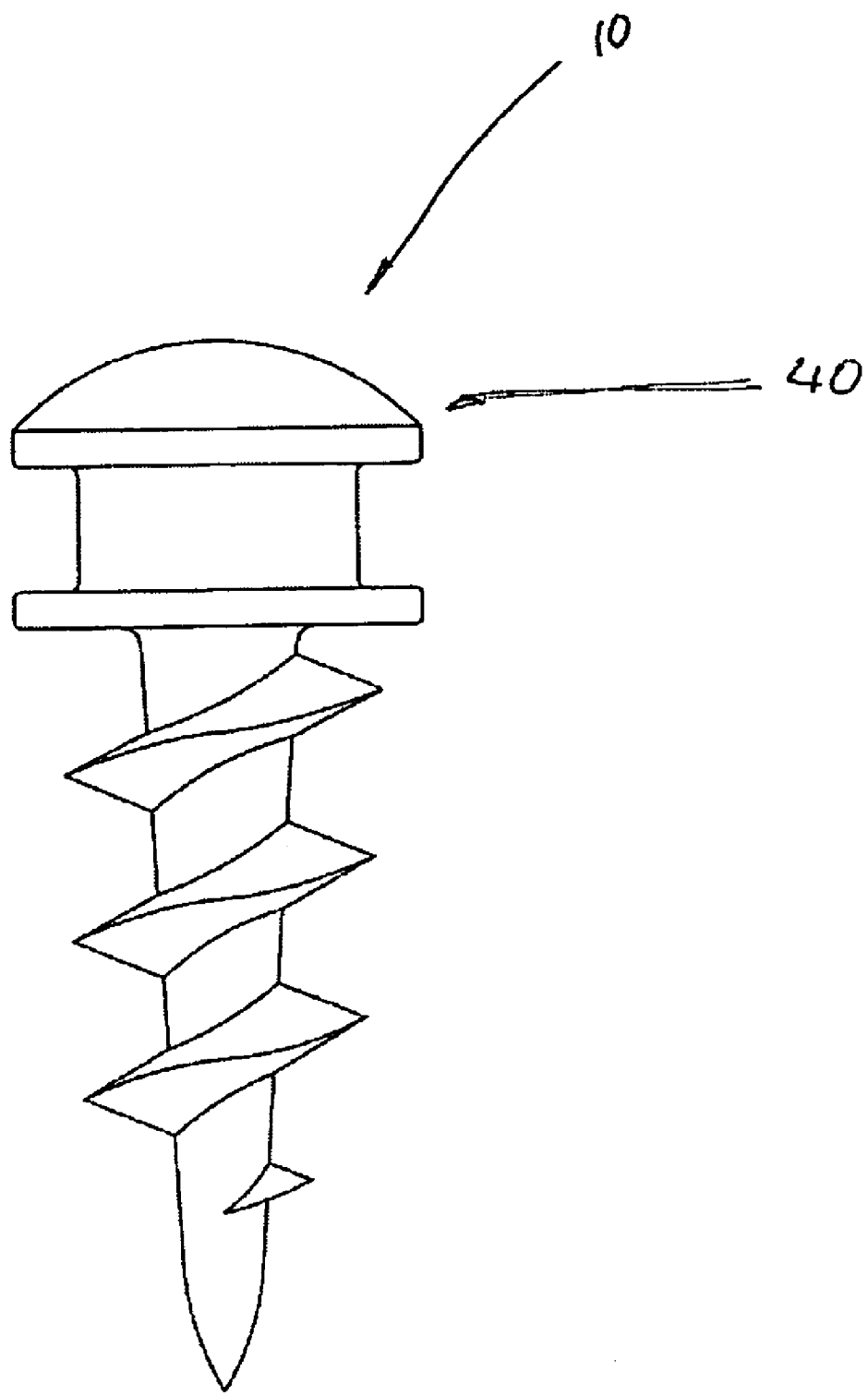
Figure 7:
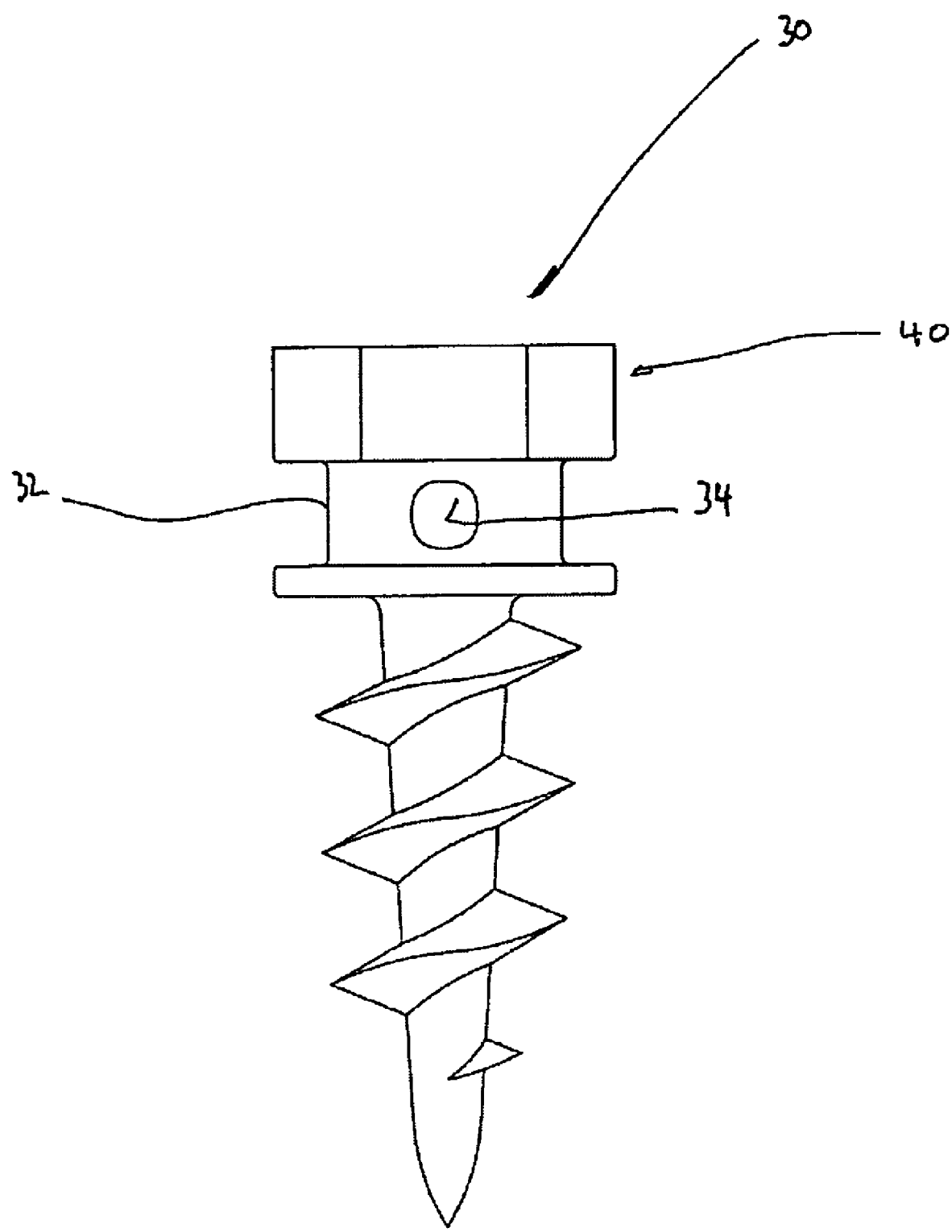
Figure 8:
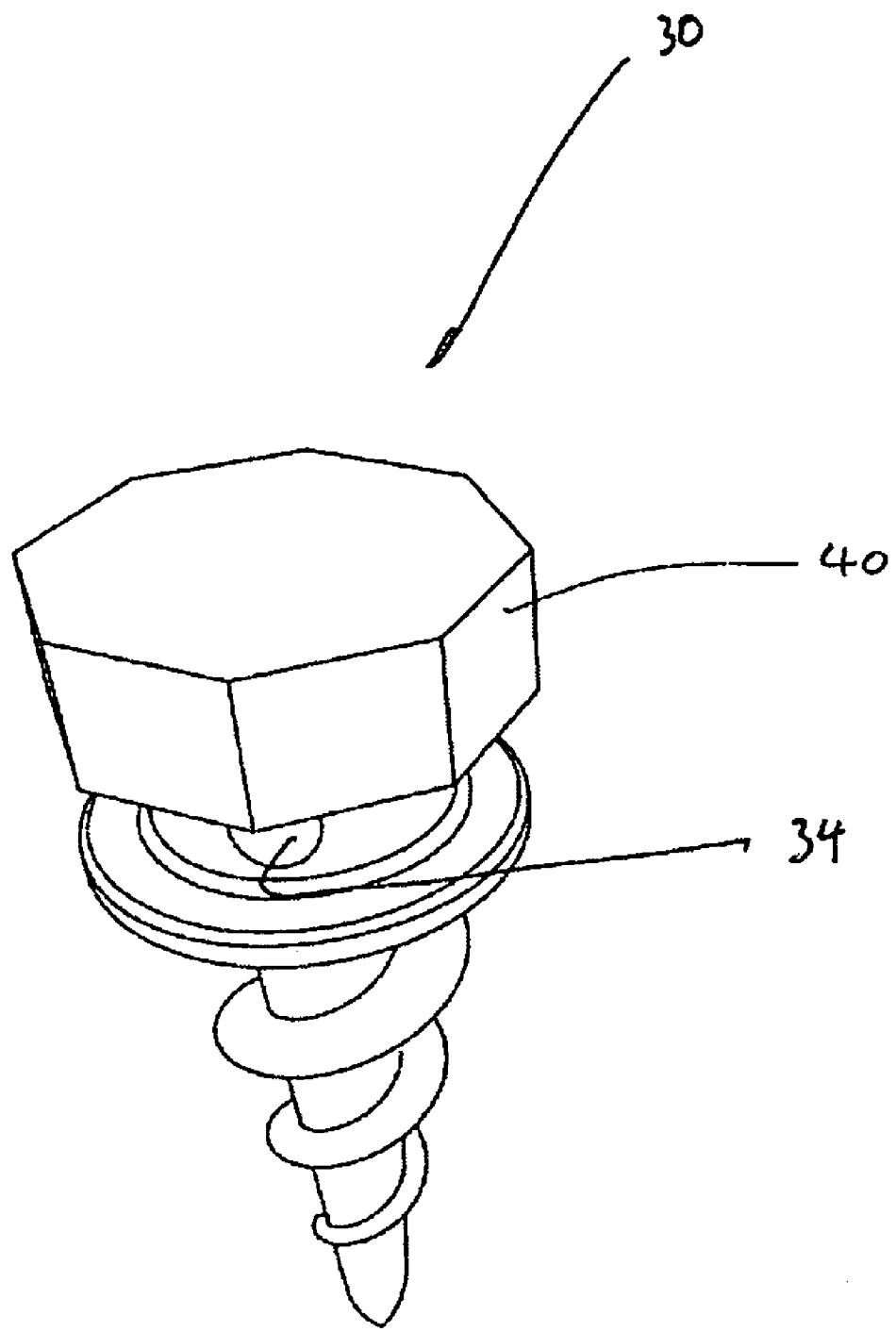

Referring to FIGS. 3a and 3b, the support device 10 has a flat support head portion without a transverse passage through the neck, which is otherwise apparent in the support device 30 of FIGS. 4a, 4b and 5. FIGS. 6, 7 and 8 show the varying styles of support head portions 40 that have an aesthetic appeal and more specifically in FIGS. 7 and 8 functionality, by having an eight sided support head portion 40 complementary to an eight sided hand tool (not shown).

Conveniently, the support device 30 may be packaged together with the support accessory 38 for providing a convenient package for anchoring the support device 30 into a target site of a structure. The support device 30 and the support accessory 38 is adapted for insertion into the target site of the structure 12, which may include wood, plastic, and paper, cardboard, concrete, brick, steel or a combination of those materials, along with instructions for use. The support device 30 is also desirably made of a material with sufficient strength to support the weight bearing load of at least one kilogram in weight, though other weights may also be suitable, as desired. A most preferred form of material for the support device 30 is metal, such as alloys of aluminum, copper, steel, magnesium and zinc.

Referring to FIGS. 1a to 1c, the support device 10 is secured on wall 12, by first tapping support head portion so that the elongate shank portion 24 penetrates the wall 12. The elongate shank portion 24 is next screwed into the target site using a conventional tool such as a screwdriver or even a non-conventional tool such as a butter knife or a nail file. The elongate shank portion 24 is screwed until the shoulder flange 20 abuts the outer surface of the wall 12, with the support head portion 16 projecting outwardly therefrom. One or more articles may then be mounted on the support head in a number of different orientations, with or without other hanging accessories. A plate (not shown) can be secured in a "plate hanger" of the type which commonly provides an anchoring loop which can be aligned with and placed on the upper region of the neck. A picture frame may be provided with a wire and/or one or more other hanger attachments.

Referring to FIGS. 2a to 2g, the support accessory 38 may be used to deliver the torque for drawing the elongate shank portion 46 into the wall. In this case, the hooked support formation 44 may be oriented to fit within the transverse passage 34 and then manipulated by hand to twist the support device 30 into the wall.

Figure 19A:
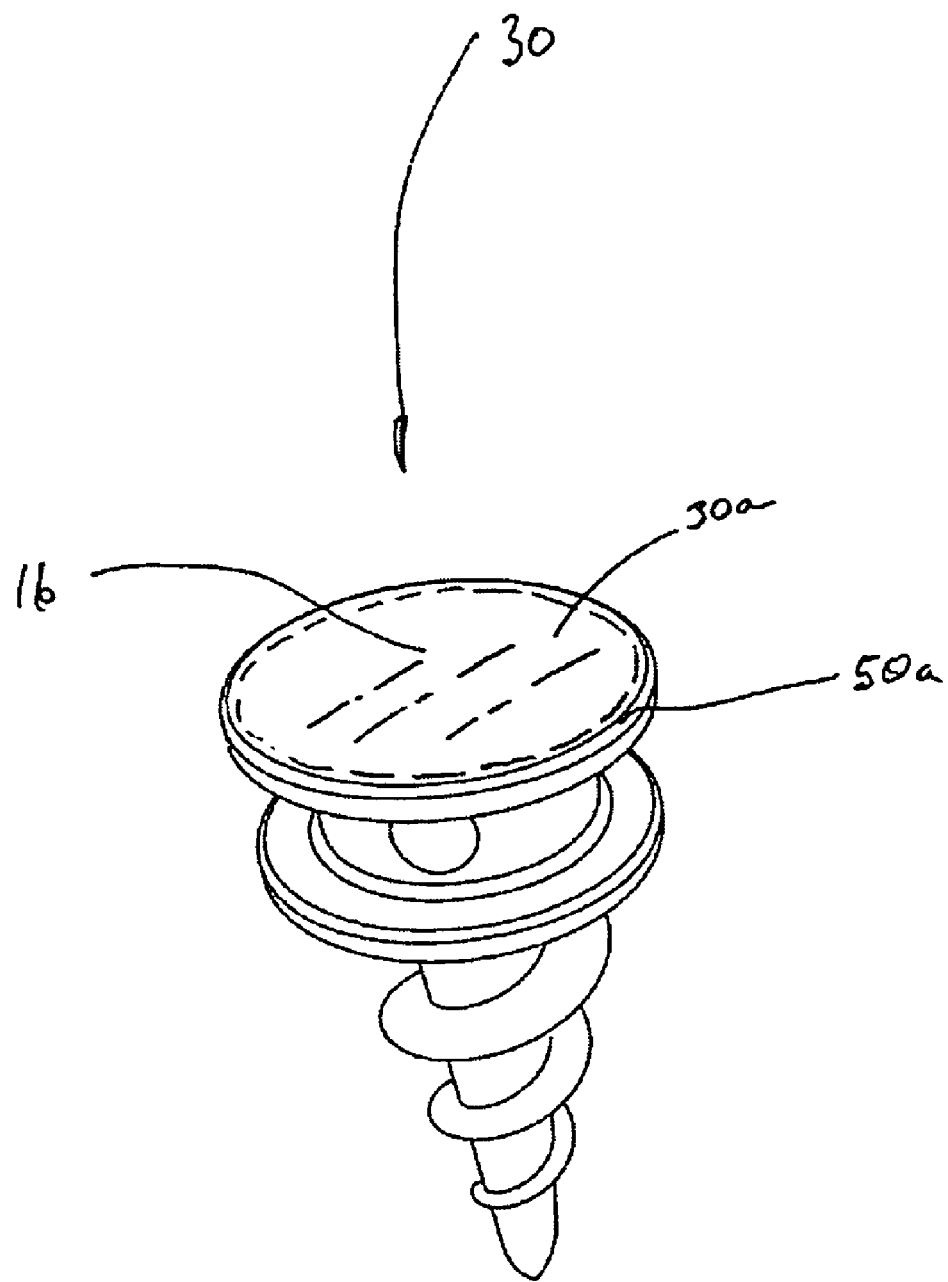
FIGS. 19a, 19b, 19c and 19d, are perspective and sectional views of another support device receiving an indicia of a pre-determined design theme is in the form of an insignia insert cap thereon.
Figure 19B:
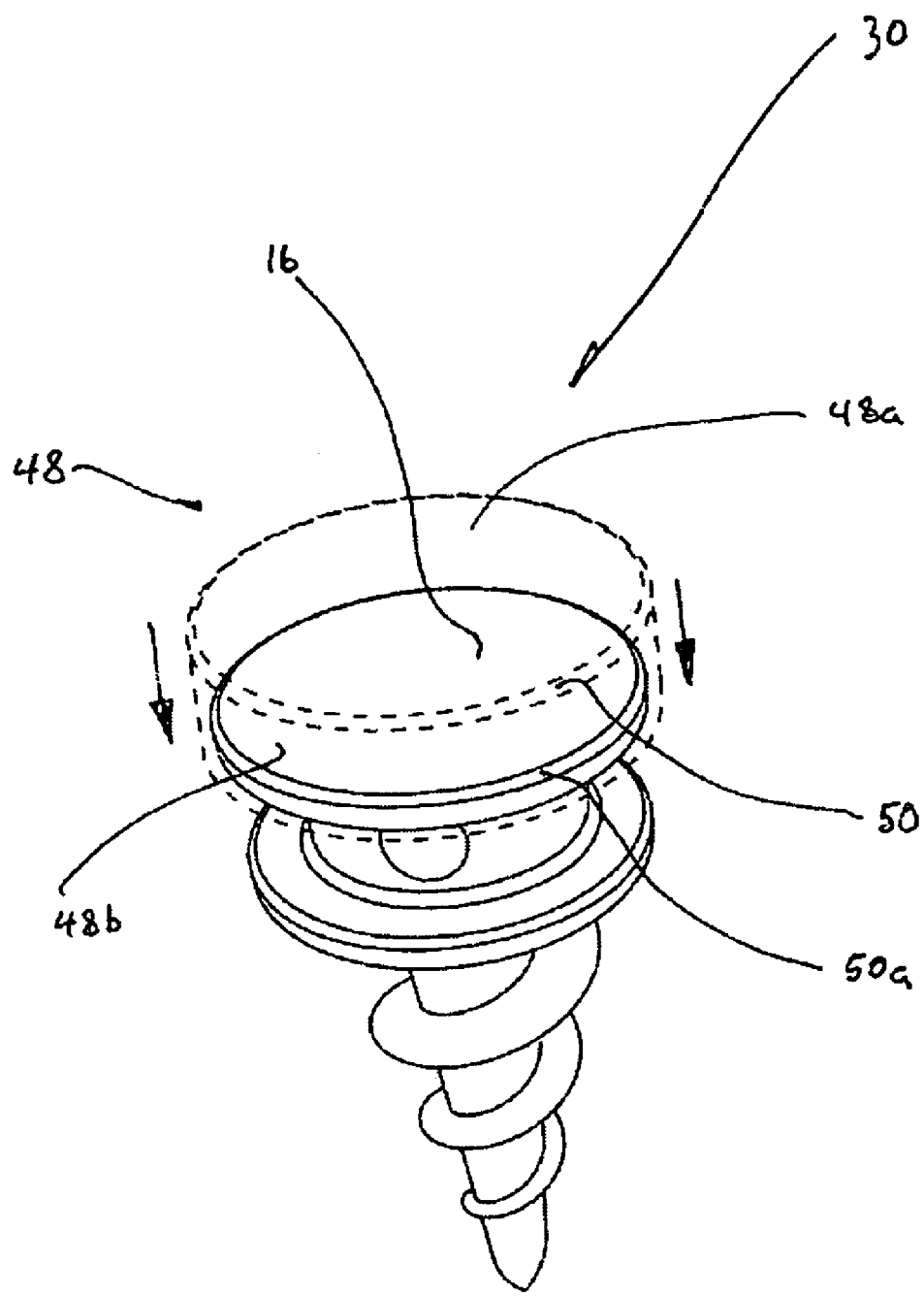
Figure 19C:
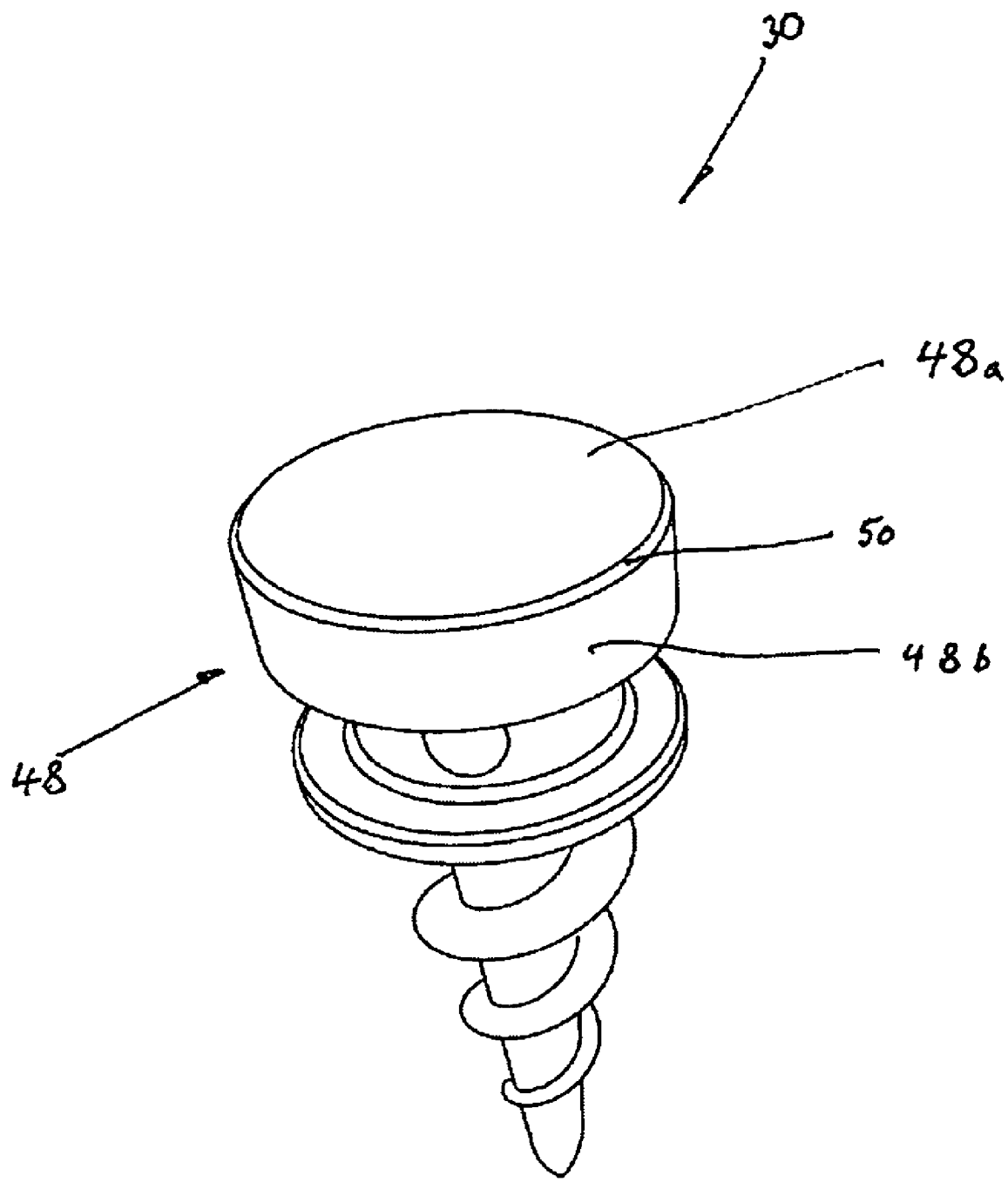
Figure 19D:
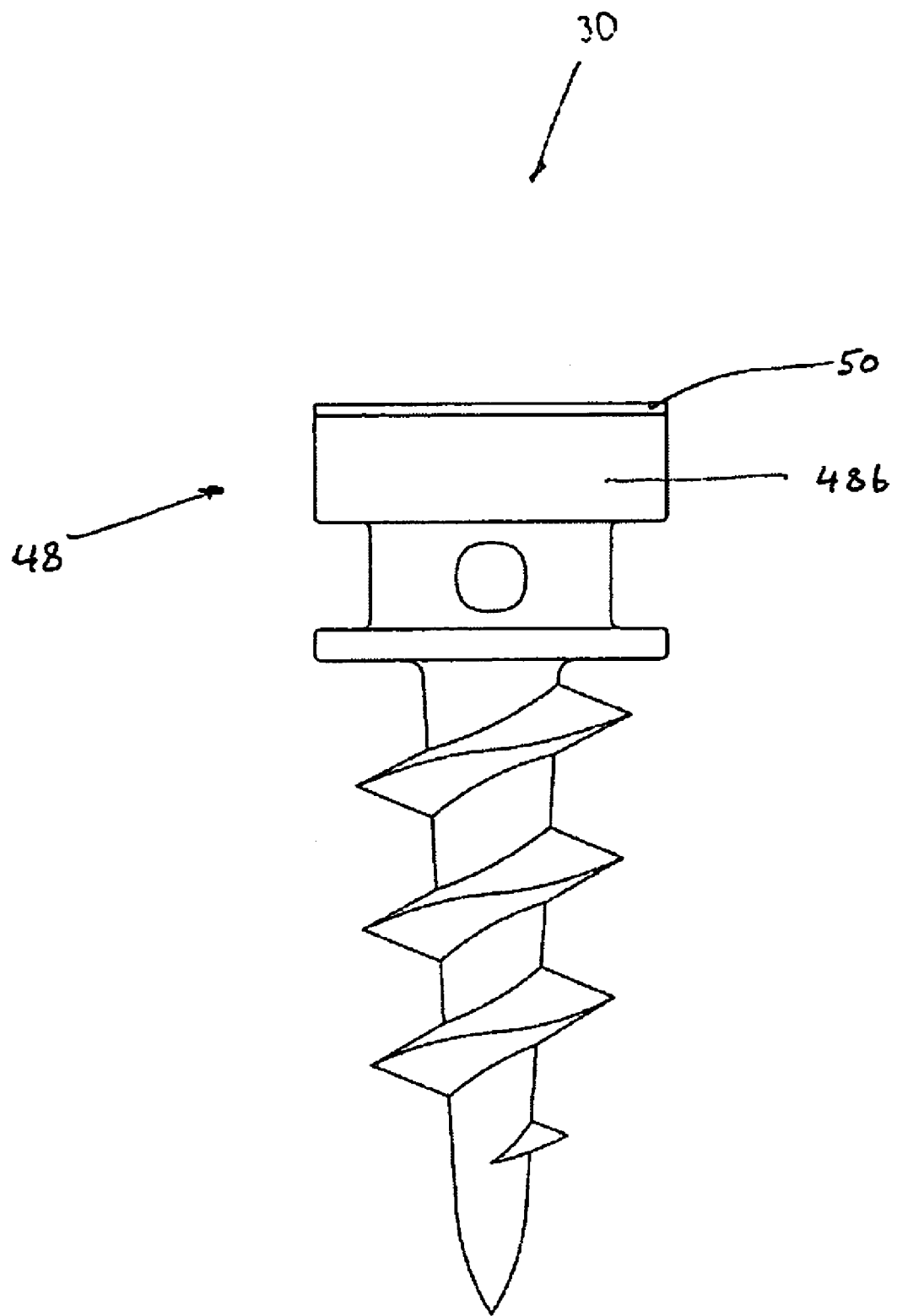

Referring to FIGS. 19a through to 19d, the pre-determined design theme is on a removable cap 48 positioned over the support head portion 16. The cap has a top portion 48a with a beveled edge 50 extending down onto the cap side portion 48b which extends around the periphery of the cap 48. The support head portion 16 has a corresponding beveled edge 50a extending around its periphery. When depressed the cap 48 is firmly set on to the support head portion 16, the cap 48 has an indicia of a pre-determined design theme in the form of, an insignia thereon.

Alternatively, the support accessory 38 may be used by aligning the looped portion 42 with the support head portion 40 and orienting the support accessory 38 so that the hooked support formation 40 is placed in an upright ready position.

The present invention comprehends various other modifications. For instance, a hook may be hung on the shoulder of the supporting device 30 to accommodate objects. Moreover, the head of the button-head may be configured to accept a given conventional screw-driver.

Figure 2A:
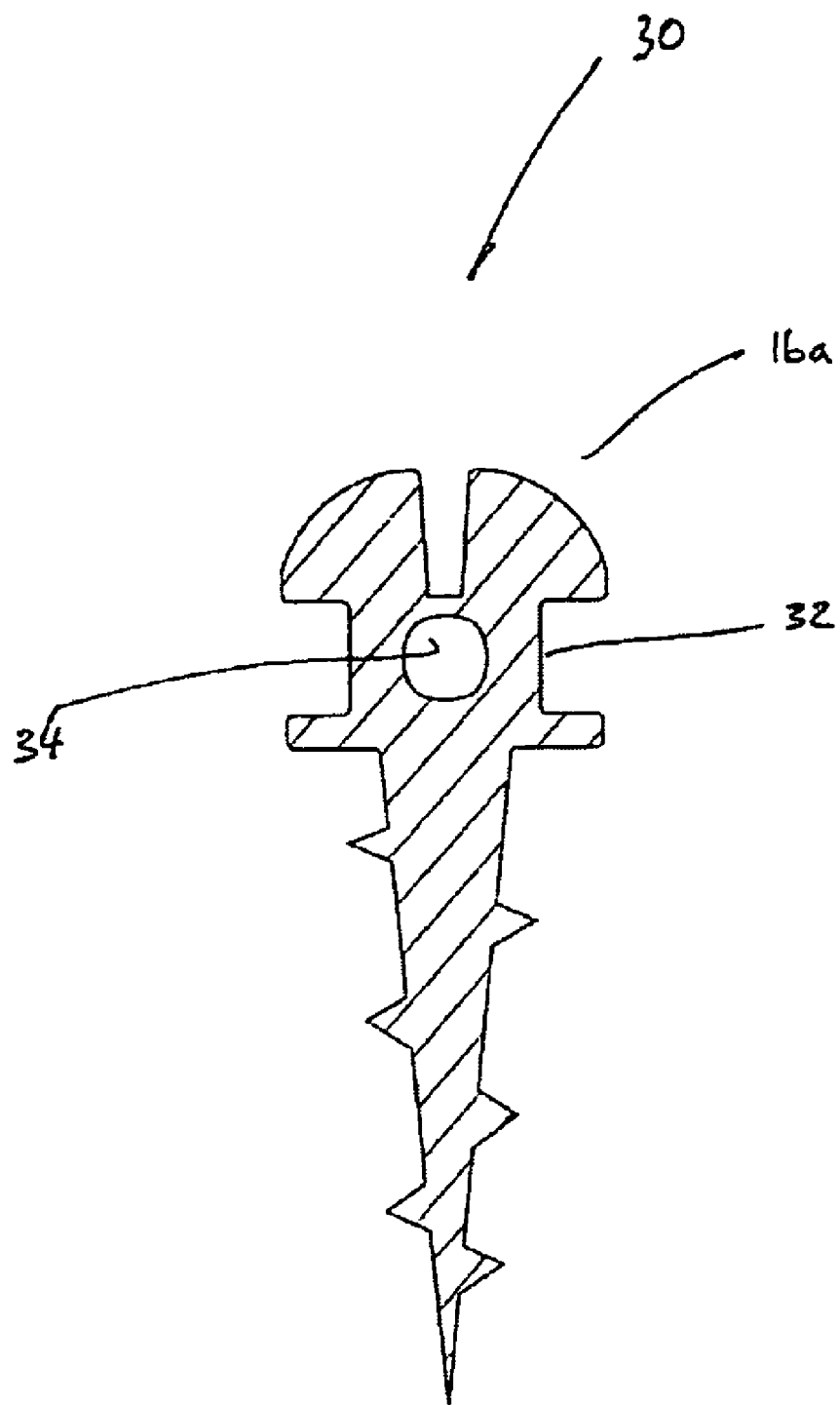
FIGS. 2a, 2b, 2c, 2d, 2e, 2f and 2g are sectional, side and perspective views of another support device and support accessory with a torque tool.
Figure 2B:
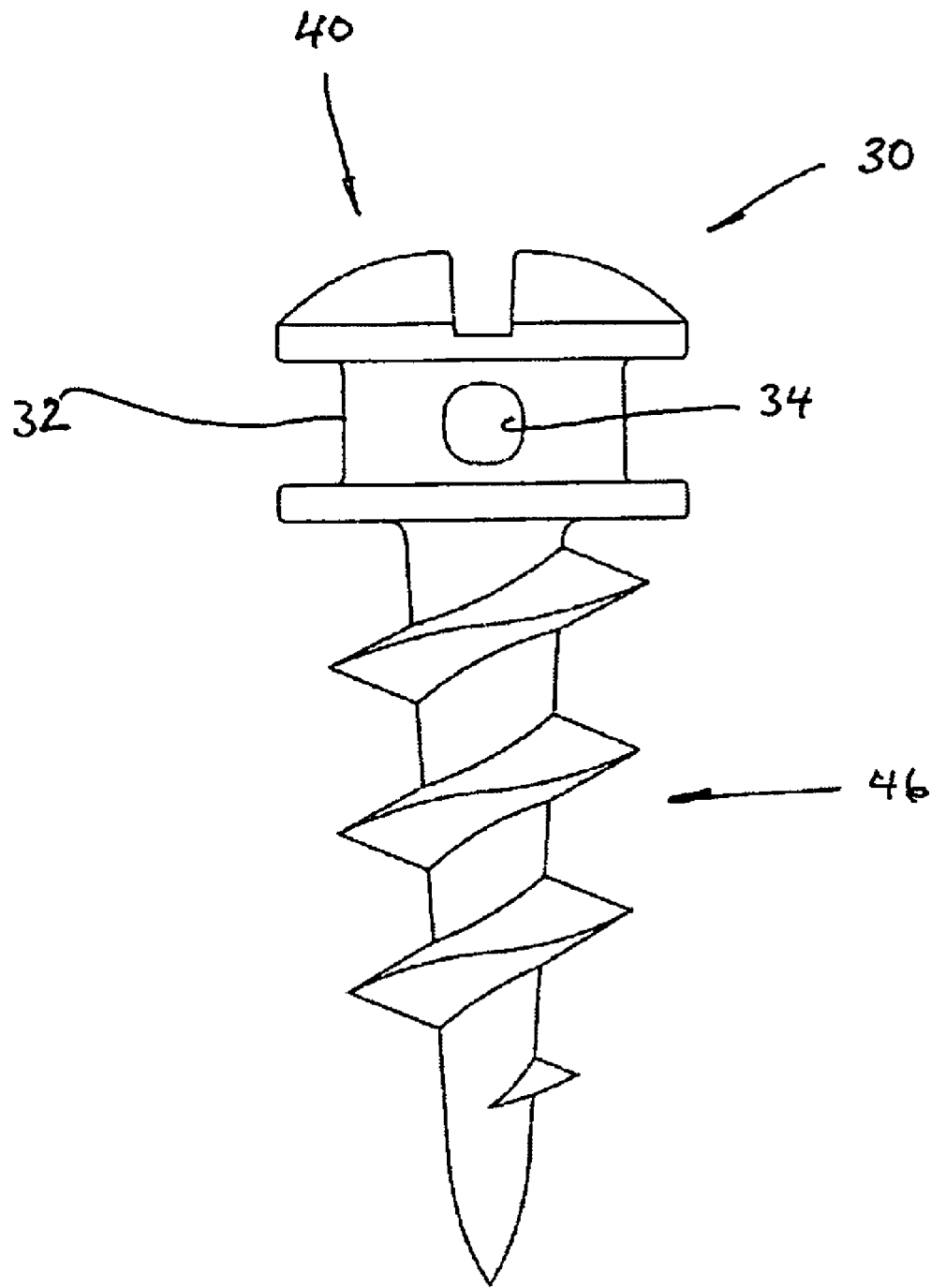
Figure 2C:
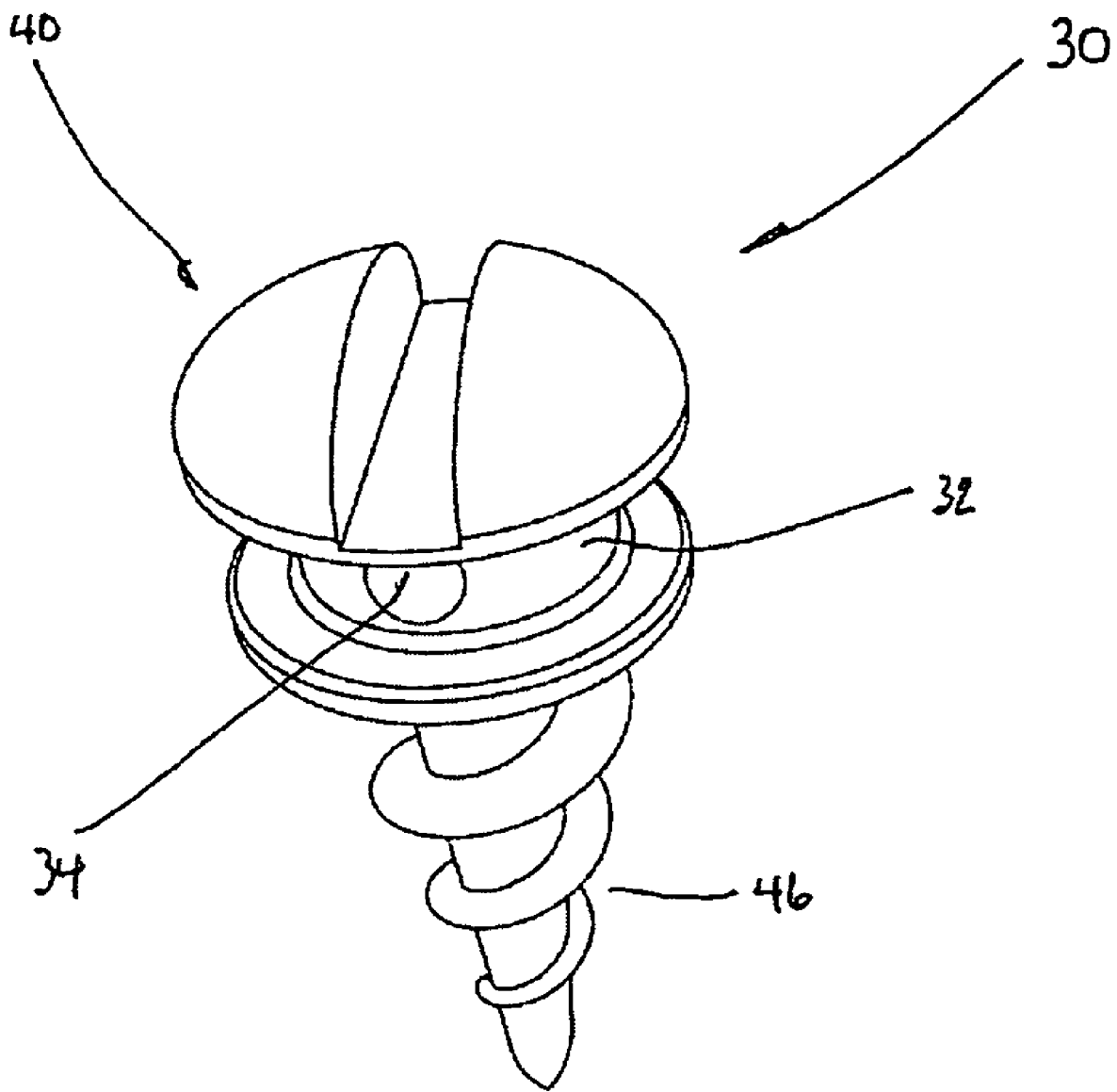
Figure 2D:
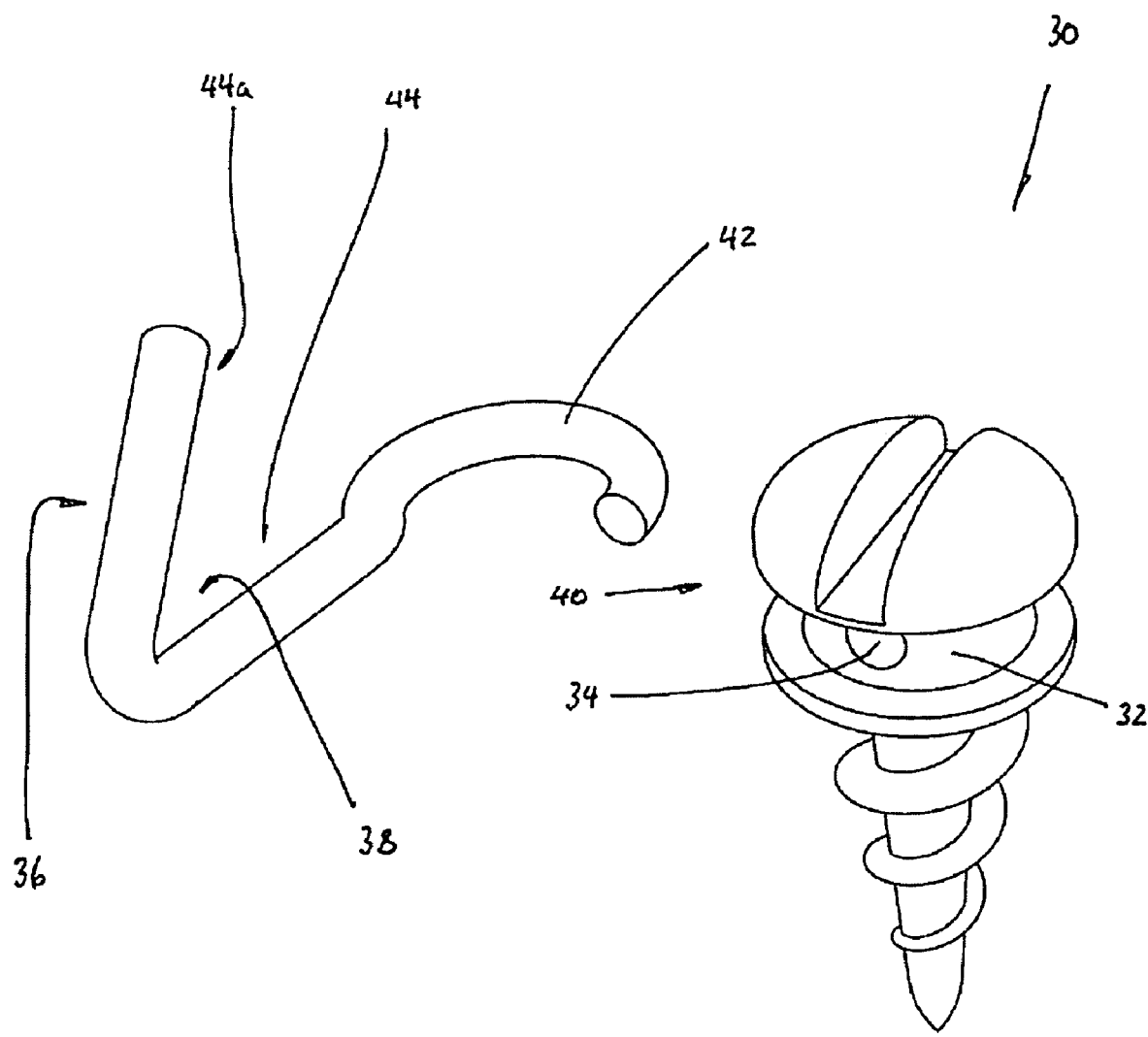
Figure 2E:
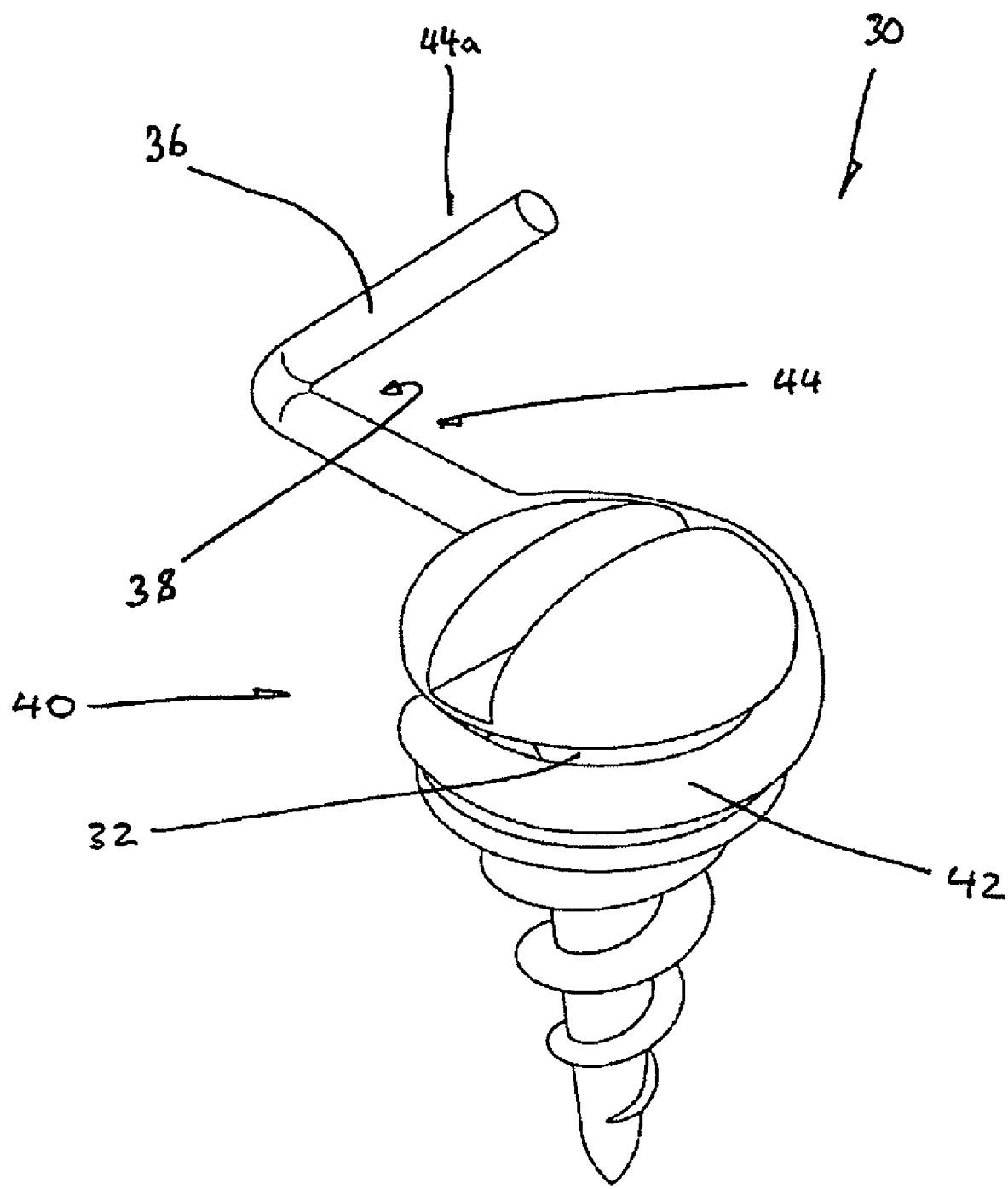
Figure 2F:
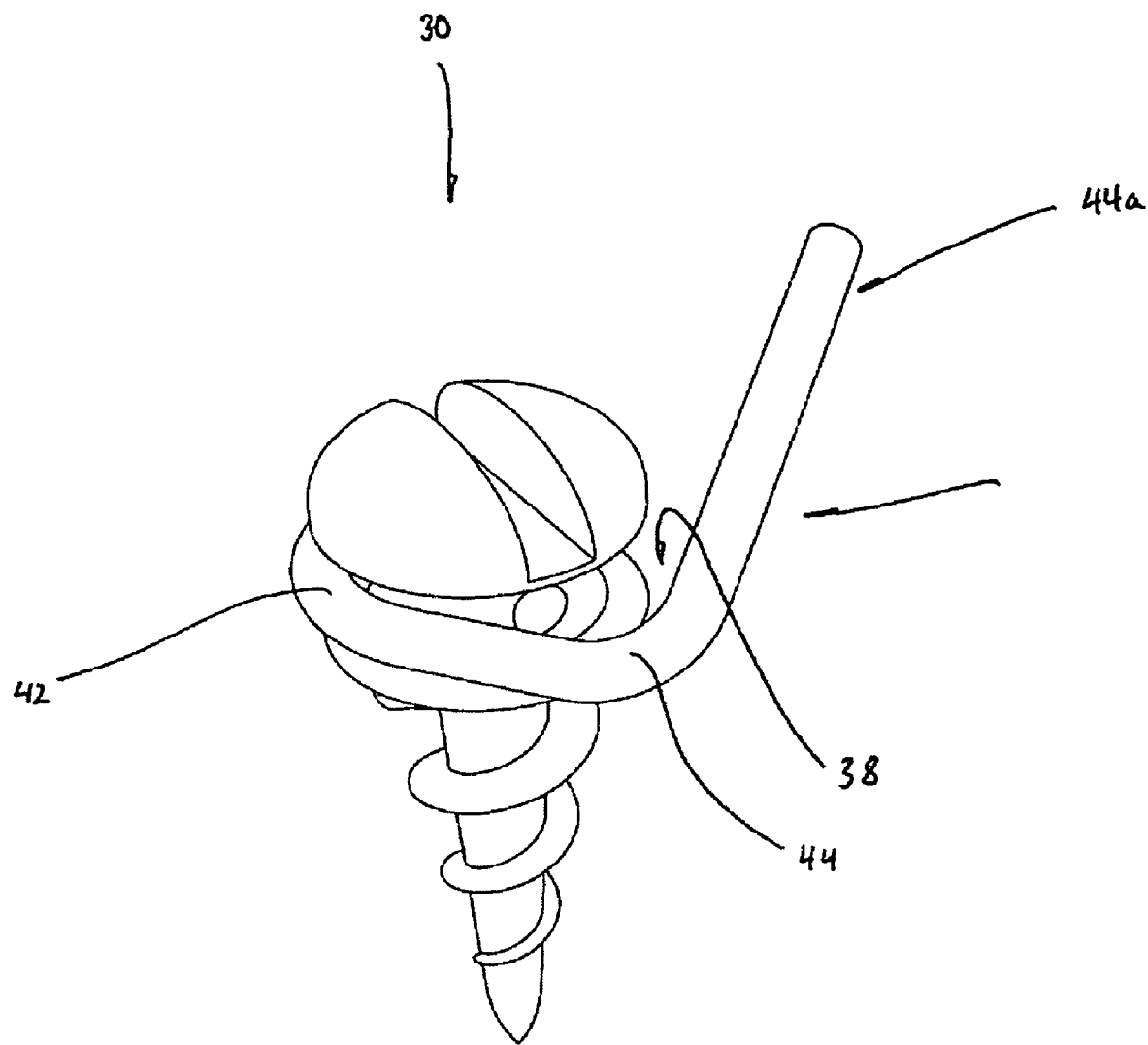
Figure 2G:
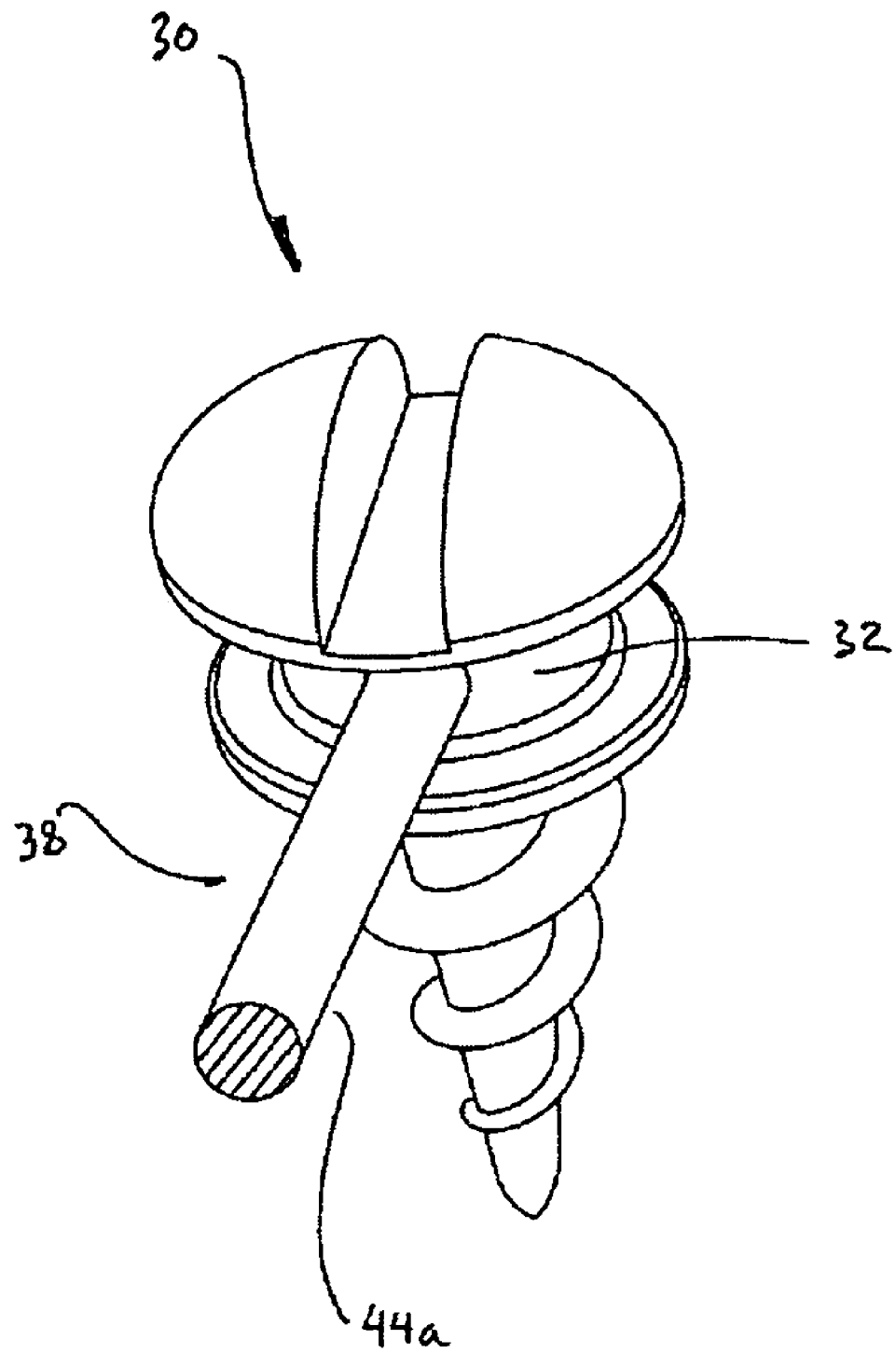

Although the support device 30 of FIG. 2a is useful with a torque tool, for its installation, a wire (for example of the type to mount an article such as a picture) may also be passed through the hole and provided with a force delivery tool to rotate the device thereby driving it into the support structure.

Advantageous embodiments of the present invention, provide varying dimensions of the support head portion as well as the neck, flange and elongated shank. For example, the aforementioned dimensions may be increased or decreased depending on the desired holding capacity of the supporting device. The neck and/or shoulder flange may be adapted to accommodate various fasteners which are mounted on an article to be hung from a support structure such as a wall. Examples include saw-tooth hangers, ring fasteners, picture cords, plate hangers, mirror clips and keyhole fasteners.

Another advantageous embodiment of the present invention is provided in the material for the support device, which as an alternative to metal, such as alloys of aluminum, copper, steel and magnesium and zinc, there are materials including hardened plastic, Teflon® and Nylon® and other suitable materials.

Further advantageous, embodiments of this invention provide a support device that can be easily installed, for example, without requiring conventional tools. The self-tapping feature of the present invention removes a cumbersome installation process known in the art and in replace incorporates the end user with an ease of installation. For instance, the support device may be installed by simply tapping gently on the support device until it penetrates the wall and then by turning the support device with a flat screwdriver, butter knife, nail file or the like.

Even further, embodiments of the present invention provide, variable dimensions of the height of the thread, which is measured from a point on the edge to an adjacent point on the surface of the shank, that in effect diminishes progressively from an end of the thread adjacent to the head-support to an end of the thread adjacent to the tip of the shank.

Furthermore, embodiments of the invention provide a support device that can support heavy weights, e.g., up to 30 lbs in drywall. Moreover, embodiments of the present invention provide a supporting device when operative having minimal play when installed due to the provision of the flange. More specifically, the flange of load bearing support device is flush against the wall (support structure) that restricts the amount of lateral and/or longitudinal movement of the support device. The variations in the sizes of the flange may be used to accommodate heavier load bearing weights.

A further embodiment of the present invention provides a head of the support head portion that receives the torque tool as opposed to any other portion of the support head portion.

Even further embodiments of the present invention provide the support device with an indicia of a pre-determined design theme is in the form of an insignia insert. The insert being made of a material or in a combination with another material, for example, paper on metal substrates which are attached to the support head portion as shown in dashed lines at 30a in FIG. 19a.

In an even further embodiment, the present invention provides, for various metal insignias being formed on to the support device during the molding process.

Referring to FIGS. 20 and 21, a mold is provided at 50 for use in the manufacture of one or more than one support device as described. The mold has a pair of mating surfaces 52, 54, each with a corresponding cavity arrangement 52a, 54a for producing a blank 56. In this case, the blank includes a pair of blank portions 56a, 56b separated by a web 56c. Lines of weakness are formed at 56d, 56e which, when severed, yield two support portions 10 as described.

Although embodiments of the invention have been described and illustrated in detail, it is to be clearly understood that the same is by way of illustration and example only and not to be taken by way of limitation, the spirit and scope of the present invention being limited only by the appended claims.

The invention claimed is:

1. An article support system for hanging an article on a wall including drywall material, comprising:
   a hanging element adapted to be integral with the article;
   a support device adapted to be attached to the wall and comprising an elongate body having a central longitudinal axis, a first end, and a second end and including:
      a head disposed at the first end of the elongate body;
      a neck adjacent to the head, the neck being circular in cross-section and extending outward from the longitudinal axis a distance less than the distance the head extends outward from the longitudinal axis;
      a shoulder flange adjacent to the neck, the shoulder flange being circular in cross-section, including a first surface perpendicular to the longitudinal axis and adapted to contact a corresponding surface of the wall, a second surface perpendicular to the longitudinal axis adapted to face away from the wall, and a side surface extending between the first and second surfaces, the side surface being parallel to the longitudinal axis, wherein the shoulder flange extends outward from the longitudinal axis a distance at least equal to the distance the head extends outward from the longitudinal axis; and an elongate shank and threads extending therefrom adapted to be embedded in the drywall material, the shank extending from the shoulder flange to the second end of the elongate body for anchoring the support device at a target site on the wall, the shank having a profile on the shank surface along the longitudinal axis between the shoulder flange to the second end of the elongate body, wherein only the second surface of the shoulder flange, the shank, and the threads are adapted to contact the wall, wherein the shank tapers along the shank profile in a substantially linear manner at a first angle to the longitudinal axis from a greatest diameter proximate to the shoulder flange until a point on the shank profile proximate to the second end where the angle of such tapering increases relative to the longitudinal axis, such point being a point of increased tapering, and such tapering continues until the shank narrows down to a pointed end at the second end of the elongate body, wherein the threads terminate between the shoulder flange and the point of increased tapering, leaving the shank between the point of increased tapering and the second end substantially smooth, wherein between the point of increased tapering and the second end of the elongate body the surface of the shank continuously curves in tapering to the pointed end, and wherein the head, neck, or a combination thereof engage the hanging element of the article to support the article.

2. The article support system of claim 1, wherein the article is a picture frame.

3. An article support system comprising:
an article including a hanging element;
a wall including drywall material;
a support device for hanging the article on the wall, the support device attached to the wall and including an elongate body having a central longitudinal axis, a first end, and a second end and including:
a head disposed at the first end of the elongate body;
a neck adjacent to the head, the neck being circular in cross-section and extending outward from the longitudinal axis a distance less than the distance the head extends outward from the longitudinal axis;
a shoulder flange adjacent to the neck, the shoulder flange being circular in cross-section, including a first surface perpendicular to the longitudinal axis and contacting a corresponding surface of the wall, a second surface perpendicular to the longitudinal axis facing away from the wall, and a side surface extending between the first and second surfaces, the side surface being parallel to the longitudinal axis, wherein the shoulder flange extends outward from the longitudinal axis a distance at least equal to the distance the head extends outward from the longitudinal axis; and an elongate shank and threads extending therefrom embedded in the drywall material, the shank extending from the shoulder flange to the second end of the elongate body for anchoring the support device at a target site on the wall, the shank having a profile on the shank surface along the longitudinal axis between the shoulder flange to the second end of the elongate body, wherein only the second surface of the shoulder flange, the shank, and the threads contact the wall, wherein the shank tapers along the shank profile in a substantially linear manner at a first angle to the longitudinal axis from a greatest diameter proximate to the shoulder flange until a point on the shank profile proximate to the second end where the angle of such tapering increases relative to the longitudinal axis, such point being a point of increased tapering, and such tapering continues until the shank narrows down to a pointed end at the second end of the elongate body, and wherein the threads terminate between the shoulder flange and the point of increased tapering, leaving the shank between the point of increased tapering and the second end substantially smooth, wherein between the point of increased tapering and the second end of the elongate body the surface of the shank continuously curves in tapering to the pointed end, and wherein the head, neck, or a combination thereof engage the hanging element of the article to support the article.

4. The article support system of claim 3, wherein the threads of the support device engage only drywall and the support device can hold a weight of 30 pounds hanging on the support device.

5. A method of hanging an article on a wall made of drywall material, comprising:
providing an article including an integral hanging element:
providing a support device including an elongate body having a central longitudinal axis, a first end, and a second end and further including:
a head disposed at the first end of the elongate body;
a neck adjacent to the head, the neck being circular in cross-section and extending outward from the longitudinal axis a distance less than the distance the head extends outward from the longitudinal axis;
a shoulder flange adjacent to the neck, the shoulder flange being circular in cross-section, including a first surface perpendicular to the longitudinal axis, a second surface perpendicular to the longitudinal axis facing away from the wall, and a side surface extending between the first and second surfaces, the side surface being parallel to the longitudinal axis, wherein the shoulder flange extends outward from the longitudinal axis a distance at least equal to the distance the head extends outward from the longitudinal axis; and an elongate shank and threads extending therefrom, the shank extending from the shoulder flange to the second end of the elongate body for anchoring the support device at a target site on the wall, wherein the shank tapers continuously from a greatest diameter proximate to the shoulder flange until the shank narrows down to a point at the second end of the elongate body;

tapping the head with the second end of the elongate body in contact with the wall;
penetrating the wall with the second end of the elongate body;
screwing the support device into the wall until the shank and threads are embedded in the drywall material and the second surface of the shoulder flange contacts the wall, leaving the head, the neck, the side surface of the shoulder flange, and the first surface of the shoulder flange exposed from the wall; and placing the hanging element on the support device to engage the head, neck, or a combination thereof.

6. The method of claim 5, wherein the shank tapers in a substantially linear manner at a first angle to the longitudinal axis from a greatest diameter proximate to the shoulder flange until a point of intersection proximate to the second end where the angle of such tapering increases relative to the longitudinal axis and such tapering continues until the shank narrows down to a pointed end at the second end of the elongate body, and wherein the threads terminate between the shoulder flange and the point of intersection, leaving the shank between the point of intersection and the second end substantially smooth.

7. The method of claim 6, wherein between the point of intersection and the second end of the elongate body the surface of the shank curves in tapering to the pointed end.

8. The method of claim 6, wherein screwing the support device into the wall may be performed with a butter knife or nail file.

9. The method of claim 6, wherein the support device can hold a weight of 30 pounds hanging on the support device.

10. A support device for supporting an article on a wall including drywall material, the article including a hanging element, the support device comprising:

a support device adapted to be attached to the wall and comprising an elongate body having a central longitudinal axis, a first end, and a second end and including:

a head disposed at the first end of the elongate body;

a neck adjacent to the head, the neck being circular in cross-section and extending outward from the longitudinal axis a distance less than the distance the head extends outward from the longitudinal axis;

a shoulder flange adjacent to the neck, the shoulder flange being circular in cross-section, including a first surface perpendicular to the longitudinal axis and adapted to contact a corresponding surface of the wall, a second surface perpendicular to the longitudinal axis adapted to face away from the wall, and a side surface extending between the first and second surfaces, the side surface being parallel to the longitudinal axis, wherein the shoulder flange extends outward from the longitudinal axis a distance at least equal to the distance the head extends outward from the longitudinal axis; and an elongate shank and threads extending therefrom adapted to be embedded in the drywall material, the shank extending from the shoulder flange to the second end of the elongate body for anchoring the support device at a target site on the wall, the shank having a profile on the shank surface along the longitudinal axis between the shoulder flange to the second end of the elongate body, wherein only the second surface of the shoulder flange, the shank, and the threads are adapted to contact the wall, wherein the shank tapers along the shank profile in a substantially linear manner at a first angle to the longitudinal axis from a greatest diameter proximate to the shoulder flange until a point on the shank profile proximate to the second end where the angle of such tapering increases relative to the longitudinal axis, such point being a point of increased tapering, and such tapering continues until the shank narrows down to a pointed end at the second end of the elongate body, wherein the threads terminate between the shoulder flange and the point of increased tapering, leaving the shank between the point of increased tapering and the second end substantially smooth, wherein between the point of increased tapering and the second end of the elongate body the surface of the shank continuously curves in tapering to the pointed end, and wherein the head, neck, or a combination thereof are adapted to engage the hanging element of the article to support the article.

* * * * *